United States Patent
Mast

(10) Patent No.: US 11,385,610 B2
(45) Date of Patent: Jul. 12, 2022

(54) STAGE AUTOMATION SYSTEM

(71) Applicant: Exato IP LLC, Lancaster, PA (US)

(72) Inventor: Ryan Mast, Lancaster, PA (US)

(73) Assignee: EXATO IP LLC, Lancaster, PA (US)

( * ) Notice: Subject to any disclaimer, the term of this patent is extended or adjusted under 35 U.S.C. 154(b) by 134 days.

(21) Appl. No.: 16/751,984

(22) Filed: Jan. 24, 2020

(65) Prior Publication Data

US 2021/0048786 A1 Feb. 18, 2021

Related U.S. Application Data

(60) Provisional application No. 62/938,118, filed on Nov. 20, 2019, provisional application No. 62/887,998, filed on Aug. 16, 2019.

(51) Int. Cl.
G05B 19/042 (2006.01)

(52) U.S. Cl.
CPC ............ *G05B 19/042* (2013.01); *G05B 2219/25011* (2013.01)

(58) Field of Classification Search
CPC ........ G05B 19/042; G05B 2219/25011; G05B 2219/2664; G05B 19/0426
See application file for complete search history.

(56) References Cited

U.S. PATENT DOCUMENTS

| | | | |
|---|---|---|---|
| 2011/0055231 A1* | 3/2011 | Huck | G06F 16/2471 707/751 |
| 2017/0060979 A1* | 3/2017 | Webster | H04L 12/4625 |

FOREIGN PATENT DOCUMENTS

CN 208130517 U * 11/2018

OTHER PUBLICATIONS

English Machine Translation of Chen, "Stage Convenient To Scene Switch", dated Nov. 23, 2018, Publication No. #208130517 (Year: 2018).*

* cited by examiner

*Primary Examiner* — Mohammad Ali
*Assistant Examiner* — Sheela Rao
(74) *Attorney, Agent, or Firm* — Suiter Swantz pc llo

(57) ABSTRACT

A stage automation system may include a first and second executing program configured to selectively control a first and second actionable mechanism, respectively. The stage automation system may further include a stage automation server configured to: receive, from the first executing program, a distributed program object announcement including a set of one or more time-stamped variables associated with the first actionable mechanism; transmit a distributed program object announcement to the second executing program; receive one or more data packets from the second executing program; adjust at least one time-stamped variable of the distributed program object based on the one or more received data packets; and transmit one or more data packets to the first executing program to cause the first executing program to adjust the at least one time-stamped variable of the distributed program object associated with the first actionable mechanism.

20 Claims, 21 Drawing Sheets

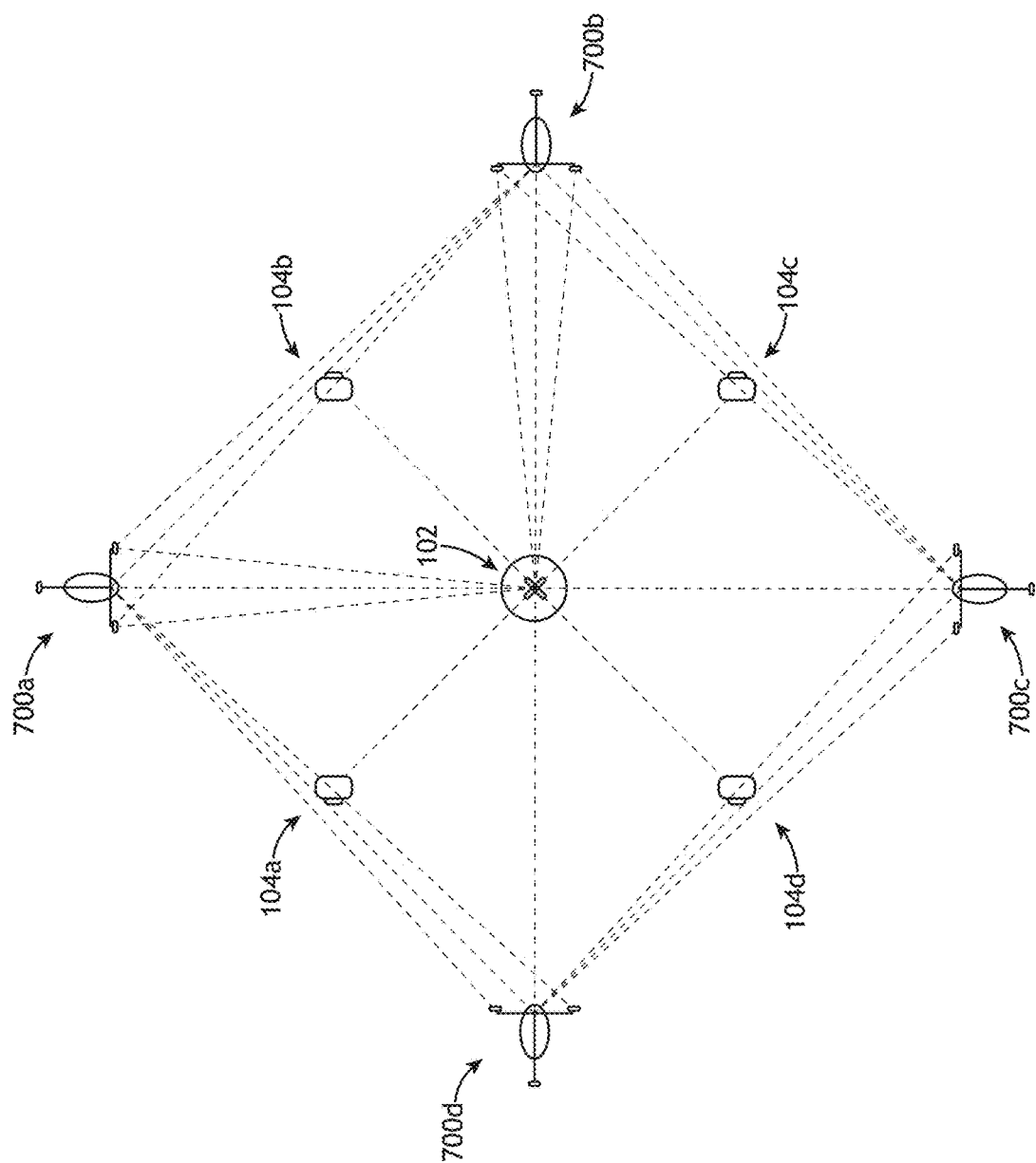

STAGE AUTOMATION SYSTEM

CROSS-REFERENCE TO RELATED APPLICATIONS

The present application claims priority under 35 U.S.C. § 119(e) to U.S. Provisional Patent Application Ser. No. 62/887,998, entitled STAGE AUTOMATION SYSTEM, filed Aug. 16, 2019, naming Ryan Mast as an inventor, and U.S. Provisional Patent Application Ser. No. 62/938,118, entitled STAGE AUTOMATION SYSTEM, filed Nov. 20, 2019, naming Ryan Mast as an inventor, both of which are incorporated herein by reference in the entirety.

TECHNICAL FIELD

The present invention generally relates to a system and method for stage automation, and more particularly, a hardware and protocol agnostic system and method for stage automation.

BACKGROUND

In the context of live events, such as concerts, plays, and sporting events, a plurality of various components and machinery may be required to work in tandem with one another in order to properly execute all of the movements and features of the live event. For example, in the context of a concert, a stage automation system may include lights, stage elevators, and winches configured to move stage props which all must execute individualized commands in tandem (e.g., coordination) with one another throughout the duration of the concert. However, many stage automation systems include hardware from disparate manufacturers, which may be configured to run on disparate software programs and communication protocols. In this regard, conventional stage automation systems do not have an efficient mechanism with which to communicate and control each hardware device within the stage automation system.

For example, many traditional stage automation systems communicate with each other across a network (e.g., TCP/IP network, serial/bus-style network such as RS-485 or CAN-bus) by reading and writing indexed "registers" across the network. To get information on the position and velocity of a certain servo drive, a controller of traditional automation systems would need to be programmed for to perform common functions on a drive. For instance, turn on the motor, release the brake, and move forward for various servo drives, the controller may need to set three separate registers on a first servo drive manufactured by a first manufacturer, and two separate registers in a particular sequence on a second servo drive manufactured by a second manufacturer. In this example, in order for the controller to interact with both the first servo drive and the second servo drive, it would need to have a map of what register indexes perform certain functions, whether each servo drive operates in 16/32/64-bit, what endian type each servo drive uses for storing and transmitting numerical data, and include specific programming for how to perform specific functions on each of the first servo drive and the second servo drive.

As shown in the example above, traditional stage automation systems including hardware and software from disparate manufacturers require excessive, tedious programming to enable efficient coordination and communication between the various devices. Additionally, programming must be performed for each hardware/software device of the stage automation system, making conventional systems difficult to modify and/or expand. Therefore, there exists a need in the art for a system and method which cure one or more of the shortfalls of previous approaches identified above.

SUMMARY

A stage automation system is disclosed. In embodiments, the stage automation system includes a first executing program configured to selectively control a first actionable mechanism, and a second executing program configured to selectively control a second actionable mechanism. The stage automation system may further include a stage automation server configured to: receive, from the first executing program, a distributed program object announcement including a set of one or more time-stamped variables associated with the first actionable mechanism; generate a distributed program object associated with the first actionable mechanism, the distributed program object including the set of one or more time-stamped variables; transmit the distributed program object announcement to the second executing program; receive one or more data packets from the second executing program; adjust at least one time-stamped variable of the distributed program object stored in memory based on the one or more received data packets; and transmit one or more data packets to the first executing program. In embodiments, the one or more data packets are configured to cause the first executing program to adjust the at least one time-stamped variable of the distributed program object associated with the first actionable mechanism, and the first executing program is configured to adjust one or more characteristics of the first actionable mechanism associated with the at least one adjusted time-stamped variable.

A stage automation system is disclosed. In embodiments, the stage automation system includes a stage automation server communicatively coupled to one or more executing programs via a network protocol. In embodiments, the stage automation server is configured to: receive, from a first executing program, a distributed program object announcement including a set of one or more time-stamped variables associated with an actionable mechanism running on the first executing program; generate a distributed program object including the set of one or more time-stamped variables in memory; transmit the distributed program object to at least one additional executing program; receive one or more data packets from the at least one additional executing program; adjust at least one time-stamped variables of the set of one or more time-stamped variables of the distributed program object stored in memory based on the one or more received data packets; and transmit one or more data packets to the first executing program. In some embodiments, the one or more data packets are configured to cause the first executing program to adjust at least one time-stamped variable of the one or more time-stamped variables associated with the actionable mechanism and adjust one or more characteristics of the actionable mechanism associated with the at least one adjusted time-stamped variable.

A method is disclosed. In embodiments, the method includes: receiving, from a first executing program, a distributed program object announcement including a set of one or more time-stamped variables associated with a first actionable mechanism selectively controlled by the first executing program; generating a distributed program object associated with the first actionable mechanism, the distributed program object including the set of one or more time-stamped variables; transmitting the distributed program object to a second executing program; receiving one or more data packets from the second executing program;

adjusting at least one time-stamped variable of the distributed program object based on the one or more received data packets; transmitting one or more data packets to the first executing program indicative of the at least one adjusted time-stamped variable; and selectively adjusting one or more characteristics of the first actionable mechanism associated with the at least one adjusted time-stamped variable.

BRIEF DESCRIPTION OF THE DRAWINGS

The numerous advantages of the disclosure may be better understood by those skilled in the art by reference to the accompanying figures in which:

FIGS. 6A-1 to 6E-2 illustrate conceptual diagrams of a stage automation system, in accordance with one or more embodiments of the present disclosure.

FIGS. 7A-7E illustrate a three-dimensional (3D) tracking system of a stage automation system, in accordance with one or more embodiments of the present disclosure.

DETAILED DESCRIPTION OF THE INVENTION

Reference will now be made in detail to the subject matter disclosed, which is illustrated in the accompanying drawings.

Referring generally to FIGS. 1-8, the present disclosure is generally directed to a system and method for coordinated stage automation. In particular, embodiments of the present disclosure are directed to a stage automation system which is configured to unite actionable mechanisms (e.g., mechanical devices) manufactured by varying manufacturers (and therefore operated on varying software/executing programs) under a common communication umbrella. Additional embodiments of the present disclosure are directed to a method of controlling a stage automation system including a plurality of motion devices operating on varying executing programs.

It is contemplated herein that embodiments of the present disclosure may facilitate the efficient communication and cooperation of varying actionable mechanisms within a stage automation system. By communicating with each actionable mechanism and executing program within a stage automation system with a common communication protocol, embodiments of the present disclosure may enable highly coordinated and scalable stage automation systems.

Figure 1:
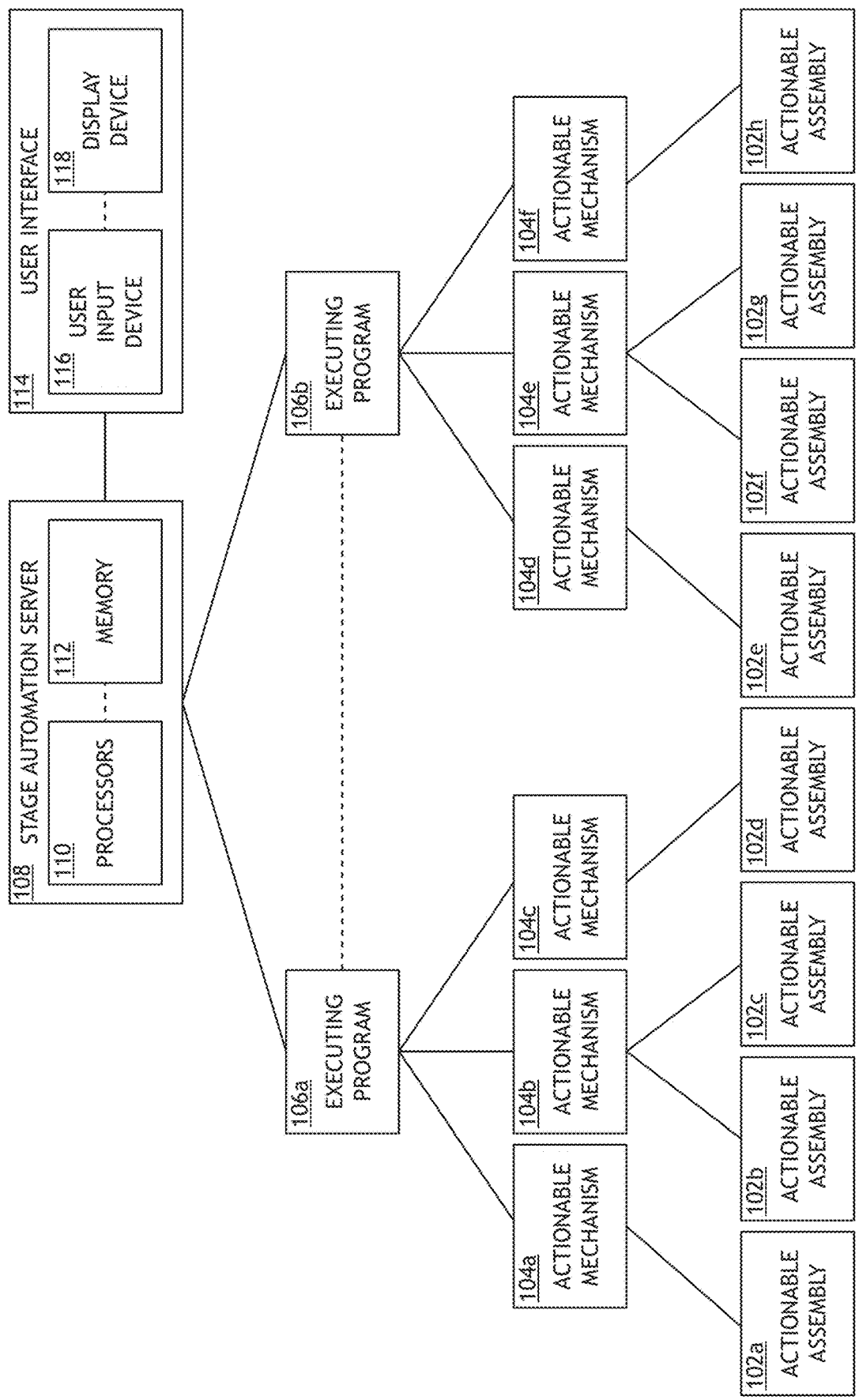
FIG. 1 illustrates a simplified block diagram of a stage automation system, in accordance with one or more embodiments of the present disclosure.

FIG. 1 illustrates a simplified block diagram of a stage automation system 100, in accordance with one or more embodiments of the present disclosure. The stage automation system 100 may include, but is not limited to, one or more actionable assemblies 102, one or more actionable mechanisms 104, one or more executing programs 106, a stage automation server 108, and a user interface 114.

In one embodiment, the stage automation system 100 may be used in the context of live performances in order to implement hardware and software-agnostic automation. For example, the stage automation system 100 may be utilized to control hardware (e.g., actionable assemblies 102, actionable mechanisms 104) in the context of concerts, plays, sporting events, and the like. In embodiments, each implementation of the stage automation system 100 may be defined/described as an "environment," such that the stage automation assembly 100 implemented in the context of a first concert is identified by a first environment, and the stage automation assembly 100 implemented in the context of a second concert is identified by a second environment. In embodiments, an environment may include at least a stage automation server 108 and one or more executing programs 106. An environment may be defined by a unique UUID, a date and time the respective environment was initialized, and a running clock in seconds from when the environment was initialized. Data associated with each environment may be stored in a memory 112 of the stage automation server 108. An environment may be further defined by a UUID of a configuration file which set up the particular environment. Generally, as it is used herein, the term "environment" may be regarded as an individual "session" of the stage automation system 100.

The stage automation server 108 may include a local server/controller and/or a remote server/controller. For example, each environment may include a local server/controller which controls and stores data associated with the environment throughout the respective performance or event. Following the conclusion of the performance/event, the local server/controller (e.g., local stage automation server 108) may be communicatively coupled to a remote server/controller (e.g., cloud-based stage automation server 108) such that data associated with the environment may be uploaded and stored in a centralized, cloud-based server (e.g., cloud-based stage automation server 108). It is noted herein that synchronizing local servers/controllers with a centralized, cloud-based server (e.g., cloud-based stage automation server 108) may enable troubleshooting known issues, analysis to tune component issues, and machine learning analysis to generate predictive models around operators and various components.

In embodiments, the stage assembly system 100 may include one or more executing programs 106a, 106b (e.g., "instances") communicatively coupled to the stage automation server 108. The one or more executing programs 106a, 106b may be communicatively coupled with the stage automation server 108 and/or other executing programs 106a, 106b via any network protocol known in the art. For example, the network protocol utilized by the stage automation system 100 may include, but is not limited to, a transmission control protocol (TCP) or internet protocol (IP) network (e.g., ethernet, WiFi), a serial or bus-style network (e.g., RS-485), and the like. By way of another example, the network protocol may include a socketless user datagram protocol (UDP). In embodiments, communicative connections established between components of the stage automation system 100 (e.g., executing program 106a, 106b, stage automation server 108, and the like) are performed via the establishment of asymmetric and then symmetric encryption, such as datagram transport layer security (DTLS), transport layer security (TLS), and the like.

The one or more executing programs 106a, 106b may include software and/or code programs which are configured to control one or more actionable mechanisms 104 (e.g., devices). In embodiments, each executing software may be uniquely identified by a UUID, a UUID of the environment it exists within, and an internet protocol (IP) address. As noted previously herein, hardware and industrial mechanisms produced by various manufacturers may be run/controlled by varying software programs. In this regard, a first executing program 106a may include a software and code base of a first manufacturer executed on a first set of computers (e.g., servers, virtual machines, graphical user interfaces (GUI)), and a second executing program 106b may include a software and code base of a second manufacturer executed on a second set of computers. Each executing program 106a, 106b may include an individual runtime configuration. For example, the first executing program 106a may include a first software program with a first configuration and the second executing program 106b may include a second software program with a second configuration.

In embodiments, each executing program 106 is configured to selectively control one or more actionable mechanisms 104a-104n (e.g., "axis" or "axes"). The one or more actionable mechanisms 104a-104n may be communicatively coupled to the respective executing programs 106a-106n via any wireline or wireless communication protocol known in the art (e.g., TCP network, serial connection, and the like). The one or more actionable mechanisms 104a-104n may include any machinery or industrial motion controlling device known in the art including, but not limited to, a servo drive, a motor, a linear motor, a brake, a valve, an encoder, a solenoid, a light, a power source, and the like. For instance, an actionable mechanism 104a may include a Control Techniques M700 or a Kollmorgen AKD.

In embodiments, the one or more actionable mechanisms 104a-104n are configured to selectively control one or more characteristics of one or more actionable assemblies 102a-102n. In this regard, actionable assemblies 102a-102n may be regarded as the physical "thing" or "device" which gets moved, and the actionable mechanisms 104 may be regarded as the "controller" or means through which the actionable assemblies 102a-102n are moved. For example, the one or more actionable assemblies 102a-102n may include, but are not limited to, a stage elevator, a lineset, a screen track, a chain motor, a winch, a turntable, and the like. Operational characteristics of the actionable assemblies 102a-102n which may be selectively controlled by the actionable mechanisms 104a-104n may include, but are not limited to, a position/location, velocity, acceleration, deceleration, operational state (e.g., "active/on," "inactive/off"), voltage, wattage, current, fault state, and the like.

It is noted herein that each actionable assembly 102a-102n and/or actionable mechanism 104a-104n may be described as existing within three-dimensional (3D) space of a particular environment of the stage automation system 100. 3D positional data of various actionable assemblies 102a-102n and/or actionable mechanisms 104a-104n may be defined by (x, y, z) coordinates. Rotational data may be defined, transmitted, and stored within the stage automation system 100 as quaternions, and presented to users as Euler (x, y, z) values. For simplicity throughout the present disclosure, the position (0, 0, 0) may be defined as downstage center of a particular venue or location within which an environment of the stage automation system 100 is employed. In a similar manner, for the purposes of simplicity, upstage may correspond to positive z-values, elevations above a ground/floor may correspond to positive y-values, and stage left may correspond to positive x-values. It is further noted, however, that positional data may be shown and described in any manner known in the art and defined in relation to any frame of reference.

In embodiments, the stage automation server 108 may include one or more processors 110 and a memory 112, the one or more processors 110 configured to execute a set of program instructions stored in memory 112, the set of program instructions configured to cause the one or more processors 110 to carry out various steps of the present disclosure. For example, the one or more processors 110 of the stage automation server 108 may be configured to: receive, from a first executing program 106a, a distributed program object announcement including a set of one or more time-stamped variables associated with a first actionable mechanism 104a; generate a distributed program object associated with the first actionable mechanism 104a, the distributed program object including the set of one or more time-stamped variables; transmit the distributed program object to at least a second executing program 106b; receive one or more data packets from the second executing program 106b; adjust at least one time-stamped variable of the distributed program object stored in memory 112 based on the one or more received data packets; and transmit one or more data packets to the first executing program 106a. Each of these steps will be addressed in turn.

In embodiments, the stage automation server 108 may be configured to receive, from a first executing program 106a, a distributed program object announcement (e.g., "XaObject," "XaValuesAnnouncement") including a set of one or more time-stamped variables (e.g., "XaValues") associated with a first actionable mechanism 104a. For example, a first executing program 106a associated with a first actionable mechanism 104a may transmit a distributed program object announcement including a set of one or more time-stamped variables associated with the first actionable mechanism 104a.

Distributing program objects (e.g., "XaObjects") may include objects which read, log, and command functionality within the stage automation system 100. Each executing program 106a may transmit a distributed program object announcement associated with each respective actionable mechanism 104a-104n indicating that the respective actionable mechanism 104a-104n exist within the environment. A distributed program object may include any number of time-stamped variables associated with a component (e.g., actionable mechanism 104a), cue, or command of the stage automation system 100.

As it is used herein, "distributed program object announcements" may be regarded as initial "announcement" data packets of data which are transmitted by a particular component in order to announce the component's existence within a particular environment. More specifically, a distributed program object announcement (e.g., announcement data packet) may announce to other components of the stage automation system one or more time-stamped variables which the particular executing program 106 and/or actionable mechanism has to publish, or wishes to consume. An announcement data packet may include a list of universally unique identifiers (UUIDs) the sending component includes, and definitions for each UUID. A "definition" within an announcement data packet may be composed of the following byte string illustrated in Table 1. The number of definition byte arrays which may be included within a single announcement data packet may be dependent upon the maximum transmission unit (MTU) and maximum packet length of the stage automation system 100.

TABLE 1

"Definition" Byte Array Structure of Announcement Data Packet

| Starting Byte | Bytes | Type | Content |
| --- | --- | --- | --- |
| 0 | 16 | UUID | Time-stamped variable UUID |
| 16 | 16 | UUID | Sending component UUID |
| 32 | 1 | Byte Value Type | Value Type enum for the time-stamped variable (e.g., bool, float, double, string, bytes, GeometryPoint) |
| 33 | 1 | Byte BaseUnit | BaseUnit enum for the time-stamped variable |
| 34 | 1 | Byte Variable Mode | Variable Mode for the time-stamped variable (e.g., publish, subscribe, omni-publish) |
| 35 | 1 | | Reserved for future use |

The one or more time-stamped variables associated with the first actionable mechanism 104a may include variables associated with any characteristics (e.g., operational characteristics) of the first actionable mechanism 104a including, but not limited to, a position of the first actionable mechanism 104a at a point in time, a velocity of the first actionable mechanism 104a at a point in time, a brake engagement status of the first actionable mechanism 104a at a point in time, a connection status of the first actionable mechanism 104a at a point in time, a command or cue associated with the first actionable mechanism 104a at a point in time, and the like. By way of another example, time-stamped variables may define other characteristics of a particular component including, but not limited to, start/initiation time, network lag, commands, target position/velocity/acceleration, velocity clamp, position clamp, order in a cue sheet, and the like. The one or more time-stamped variables may include a UUID defining the time-stamped variable, a UUID of the component (e.g., actionable mechanism 104a) with which the value is associated, a unit of measurement, and time-stamps indicating when each time-stamped variable was captured.

In embodiments, each distributed program object (e.g., distributed program object announcement) may include a set of one or more value types (e.g., "XaValueType") defining types of values associated with each time-stamped variable. In this regard, each time-stamped variable of a distributed program object may be defined by a value type. Value types may include, but are not limited to, a Boolean value type (true/false), a long integer value type (numeric), a double float value type (numeric), a string value type (text), a byte array value type (data), and the like. For example, a time-stamped variable defining a DC bus voltage feedback of an actionable mechanism 104 may be defined by a value type of a double float value type (e.g., "322.12 V"). By way of another example, a time-stamped variable defining a status of a brake (e.g., actionable mechanism 104) may be defined by a Boolean value type (e.g., "true" for open, or "false" for closed). By way of another example, a time-stamped variable defining raw encoder feedback from a machine (e.g., actionable mechanism 104) may be defined by a long integer value type (e.g., "103923"). By way of another example, a time-stamped variable may define a make and/or model reported by a drive (e.g., actionable mechanism 104) as a string value type (e.g., "Kollmorgen AKD-TBAN0607"). By way of another example, a time-stamped variable defining a UUID of a drive (e.g., actionable mechanism 104) may be defined by a byte array value type in hex (e.g., "2bd2fb25b76849288fbe49874b610287").

In embodiments, each distributed program object (e.g., distributed program object announcement) may include a set of one or more variable modes defining various modes associated with each time-stamped variable. In this regard, each time-stamped variable of a distributed program object may be defined by a variable mode. Variable modes associated with each time-stamped variable may define how other components within the stage automation system 100 may view and/or interact with each respective time-stamped variable. Variable modes may include, but are not limited to, a "publish" variable mode, a "subscribe" variable mode, and an "omni-publish" variable mode.

For example, a publish variable mode indicates that the component associated with the time-stamped variable is the only component which may adjust/update the value. For instance, if an actionable mechanism 104 include a time-stamped variable indicative of current consumption for the actionable mechanism 104 with a publish variable mode, only the actionable mechanism 104 itself may adjust/update the time-stamped variable, with other components being unable to do so. By way of another example, a subscribe variable mode indicates that components which depend on the time-stamped variable (e.g., "subscribe" to the time-stamped variable) may receive published updates when the time-stamped variable is updated. For instance, if a second executing program 106b subscribes to a time-stamped variable with a subscribe value type of the first executing program 106a, the stage automation server 108 may transmit data packets/distributed program objects to the second executing program 106a each time the time-stamped variable is updated. Components may subscribe or not subscribe to other distributed program objects and/or individual time-stamped variables based on their relevance to their own operations. By way of another example, an omni-publish variable mode indicates that a plurality of components may adjust/update the value, and published updates are sent to subscribed components. For instance, a brake (e.g., actionable mechanism 104) may include a time-stamped variable indicative of operational status (e.g., on/off) with an omni-publish variable mode such that any component within the stage assembly system 100 may adjust/update the operational status of the brake (e.g., turn it on or off).

As noted previously herein, an announcement data packet (e.g., distributed program object announcement data packet) transmitted by an executing program 106 may include one or more time-stamped variables which the particular executing program 106 and/or actionable mechanism has to publish, or wishes to consume. For example, an announcement data packet transmitted by the first executing program 106a may include definitions for a first distributed program object associated with the first actionable mechanism 104a, a second distributed program object associated with the second actionable mechanism 104b, a third distributed program object associated with the third actionable mechanism 104c, a fourth distributed program object associated with the actionable assembly 102a, and the like. Announcement data packets may describe the type of each component (e.g., actionable mechanism 104, actionable assembly 102), which time-stamped variables are associated with each respective distributed program object, and a value type of each time-stamped variable. For example, an announcement data packet is shown in further detail in Table 2 below:

TABLE 2

Announcement Data Packet Structure

| Starting Byte | Bytes | Type | Content |
|---|---|---|---|
| 0 | 16 | UUID | Distributed program object UUID |
| 16 | 16 | UUID | Host executing program UUID |
| 32 | 2 | Unit XaObjectType | Value type enum for the distributed program object's type on the host executing program |
| 34 | 2 | Unit XaObjectType | Value type enum for how the distributed program object should be represented on the receiving executing program. |
| 36 | 10 | — | Reserved for future use |
| 46 | 2 | ushort | Number of time-stamped variables that will be described. |
| 48 | 16 | UUID | Time-stamped variable UUID for Value 1 |
| 64 | 2 | ushort | Number of following bytes that create the key string for Value 1 (in this example, 27) |
| 66 | 27 | UTF-16string | Key name for the time-stamped variable in the distributed program object for Value 1 |
| 93 | 16 | UUID | Time-stamped variable UUID for Value 2 |
| 109 | 2 | ushort | Number of following bytes that create the key string for Value 2 (in this example, 491) |
| 111 | 491 | UTF-16string | Key name for the time-stamped variable in the distributed program object for Value 2 |

As shown in the table above, it is noted herein that time-stamped variables with string value type may include text encoded with UTF-16 such that the number of bytes for each time-stamped variable key may be more than the number of text characters.

In embodiments, the stage automation server 108 is configured to generate a distributed program object associated with the first actionable mechanism 104a, the distributed program object including the set of one or more time-stamped variables. In this regard, the stage automation server 108 may be configured to generate and/or store the distributed program object received from the first actionable mechanism 104a in memory 112. Accordingly, time-stamped variables associated with actionable mechanism 104a (e.g., position, velocity, operational status) may be stored in memory 112. Additionally, in some embodiments, executing programs 106a-106b may transmit distributed program objects including sets of time-stamped variables and/or individual time-stamped variables at regular and/or irregular intervals. For example, the first executing program 106a may be configured to transmit a distributed program object including a set of time-stamped variables associated with actionable mechanism 104a every ten milliseconds (10 ms). In this regard, time-stamped variables associated with actionable mechanism 104a (e.g., position, velocity, operational status) may be updated and stored in memory 112 every ten milliseconds. The memory 112 may be configured to store all time-stamped variables associated with each component of the stage automation system 100 throughout the existence of an environment such that historical values throughout the environment may be easily searched and retrieved.

In the context of components (e.g., actionable assembly 102, actionable mechanism 104, executing program 106, stage automation server 108) which subscribe to one or more time-stamped variables of other components, the subscribing components may store time-stamped variables of the subscribing instances in memory. In this regard, components may store their own time-stamped variables, as well as time-stamped variables to which they are subscribed. Components may additionally be configured to transmit request packets via the network protocol in order to request specific time-stamped variables of other components from the stage automation server 108. In additional embodiments, components of the stage assembly system 100 may be configured to sync recorded/stored time-stamped variables with those recorded/stored in the memory 112 of the stage automation server 108.

In embodiment, some components may "depend" on other components or time-stamped variables such that the actions of a first component "depend" on a time-stamped variable of a second component. In this example, the time-stamped variable of the second component may be said to be "critical" to the first component. By subscribing to critical time-stamped variables of other components, the stage automation system 100 may enable a distributed, interconnected network of components with built-in fault states and commands for coordinated motion. Furthermore, as will be described in further detail herein, if the stage automation server 108 and/or another component (e.g., executing program 106, actionable mechanism 104, actionable assembly 102) is dependent on a critical packet, distributed program object, or time-stamped variable of another critical component within a predefined window (e.g., within a 20 ms window), and the component does not receive the critical packet, distributed program object, or time-stamped variable within the predefined window, the component may be configured to go into a fault state.

It is further noted herein that storing a complete (or semi-complete) database of time-stamped variables generated by the environment throughout the duration of an event may be particularly useful for troubleshooting. Currently, stage automation systems do not store a complete set of data throughout an event, such as a concert. Thus, when weird anomalies occur during the concert (e.g., stage elevator goes past height clamp, light strays from intended planned course), these anomalies are difficult to troubleshoot, and almost impossible to reproduce. By storing time-stamped variables in a central stage automation server 108, embodiments of the present disclosure may enable improved troubleshooting and stage automation management.

It is noted herein that components within the stage automation system 100 may each include one or more processors and memory. For example, each executing program 106a-106n may include one or more processors and memory, such that each executing program 106a-106n may be configured to store time-stamped variables associated with coupled components in memory. In this regard, time-stamped variables associated with a particular actionable mechanism 104 may be stored in a memory of a coupled executing program 106, the stage automation server 108, and the like. Similarly, each component within the stage automation system 100 (e.g., stage automation server, executing program 106) may include a message broker configured to transmit and/or receive time-stamped variable updates and distributed program objects throughout the stage automation system 100.

In embodiments, acknowledgement (ACK) and non-acknowledgement (NACK) packets may be handled and transmitted within the application layer of the stage automation system 100 such that non-received data packets may be identified by the UUID of the transmitting executing program 106 and an unsigned long integer value for the sequence number, and re-sent.

Data packets including distributed program objects and/or time-stamped variables transmitted via the network protocol of the stage automation system 100 may be used to monitor network lag and to ensure runtime configurations (e.g., timecodes) of each executing program 106 are in sync with that of the stage automation server 108. For example, upon receiving a distributed program object from the first executing program 106, the stage automation server 108 may transmit a data packet (ACK) including a timecode of the stage automation server 108 such that the first executing program 106a may ensure its timecode is in sync with that of the stage automation server 108.

In embodiments, the stage automation server 108 is further configured to transmit the distributed program object announcement received from the first executing program 106a to at least a second executing program 106b. In embodiments, data packets (e.g., data packets of a distributed program object announcement) transmitted via the network protocol of the stage automation server 108 perform time-syncs when passed from one component to another in order to judge network jitter and latency. For example, a time synchronization protocol, such as simple network time protocol (SNTP), a network time protocol (NTP), or a precision time protocol (PTP) may be utilized by the stage automation server 108 in order to keep internal clocks of respective components in sync, and to monitor network congestion. In some embodiments, all communication (e.g., transmitting/receiving data packets) within the stage automation system 100 is performed over two ports, thereby simplifying network security management. In this regard, in some embodiments, functionality within the stage automation system 100 may be conducted over two network ports, instead of breaking different functions of the distributed network protocol into different network ports for different functions. For example, data packets may include byte identifiers associated with a particular functional purpose within the stage automation system 100 that the data packet serves. Additionally, byte identifiers may facilitate efficient decoding of the data packet.

It is contemplated herein that performing communication within the stage automation system 100 over only two network ports may provide a number of advantages. For example, some conventional stage automation systems may utilize a plurality of ports for different functions. For example, a conventional stage automation system may utilize a 4321 port for one type of audio traffic, a 5004 port for another type of audio traffic, 8700-8708 ports for control and monitoring, 319 and 320 ports for time sync, as well as additional ports. Comparatively, by utilizing two network ports, the stage automation system 100 of the present disclosure may allow components within the system to more efficiently and effectively identify traffic originating within the stage automation system 100, and set up firewall rules to allow (or block) particular traffic.

In some embodiments, all data packets (e.g., data packets of distributed program objects) transmitted throughout the stage automation system 100 may include a common data header. An example data header of data packets transmitted throughout the network protocol of the stage automation system 100 is further shown in Table 3 below. In embodiments, values above the bolded dividing line may be transmitted unencrypted, and fully repeated in the encrypted packet. This may be done in order to validate that a received packet is from another component within the environment (e.g., another component with which the receiving component has established a communicative coupling with). Additionally, transmitting unencrypted values and repeating unencrypted values in the encrypted packet may further serve to verify that the data packet received has not been altered or corrupted following transmission.

TABLE 3

| | | | Data Packet Header | | |
|---|---|---|---|---|---|
| Starting Byte | Bytes | Type | Cast | Content | Section |
| 0 | 2 | String | | "xA" | Short |
| 2 | 1 | Byte | Packet Type | | Short |
| 3 | 1 | Byte | Component Type | | Short |
| 4 | 1 | Byte | | Version | Short |
| 5 | 3 | n/a | | Reserved for future use | Short |
| 8 | 16 | UUID | | Sending component's UUID | Short |
| 24 | 16 | UUID | | Target component's UUID; left 0 for announcement packets. | Short |
| 40 | 8 | Double | | Sender component timecode when packet was sent (this gets updated if the same packet is re-sent because of | Long |

TABLE 3-continued

Data Packet Header

| Starting Byte | Bytes | Type | Cast | Content | Section |
|---|---|---|---|---|---|
| 48 | 8 | Double | | lack of acknowledgement from the receiving side) Sender component timecode at last timecode received from target component (also gets updated on re-send) | Long |
| 56 | 8 | Double | | Last timecode received from target component (gets updated on re-send) | Long |
| 64 | 8 | Ulong | | Packet index | Long |
| 72 | 8 | n/a | | Reserved for future use | Long |

In some embodiments, all data packets (e.g., data packets of distributed program objects) transmitted throughout the stage automation system 100 may include the common short data header, as shown above in Table 3. As noted previously herein, the short header may always be transmitted unencrypted to enable debugging, coarse sanity checking before attempting decryption, and to enable traffic shaping, if necessary. Data packets transmitted via the network protocol throughout the stage automation system 100 may be further shown and described with reference to FIGS. 2A-2C.

Figure 2A:
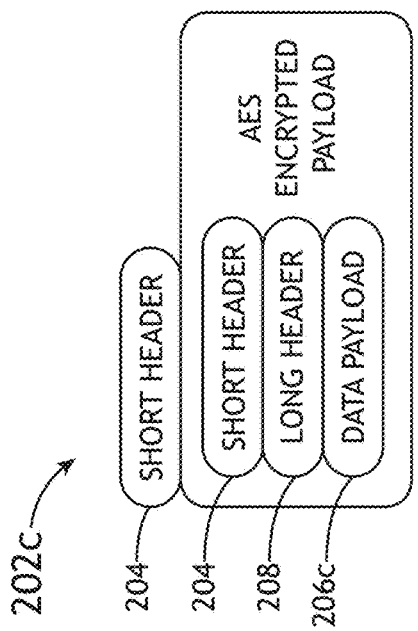
FIG. 2A illustrates an announcement data packet of a stage automation system, in accordance with one or more embodiments of the present disclosure.

FIG. 2A illustrates an announcement data packet 202a of a stage automation system 100, in accordance with one or more embodiments of the present disclosure. The announcement data packet 202a may include, but is not limited to, a short header 204 and a data payload 206a.

In order to establish communicative couplings between various components (e.g., actionable assemblies 102, actionable mechanisms 104, executing programs 106, stage automation server 108) a series of announcement and handshake data packets may be exchanged between respective components. For example, FIG. 2A illustrates an announcement packet which may be transmitted from a first component (e.g., "sending" component) to a second component (e.g., "receiving" or "target" component) in order to establish a communicative coupling between the first and second components. The announcement data packet 202a may be transmitted and/or broadcast with a short header 202 and a data payload 206a such that one or more receiving/target components may communicatively couple with the sending component. In embodiments, the data payload 206a may include an asymmetric public key (RSA) of the sending component such that receiving components may securely respond with an encrypted packet that only the sending component may decrypt.

It is noted herein that various components may transmit/receive data packets (e.g., data packets of distributed program objects) between one another through the stage automation server 108. For example, a first executing program 106a may transmit data packets to the stage automation server 108, which may then forward/transmit the data packets to a second executing program 106b. In additional and/or alternative embodiments, components may transmit/receive data packets directly between one another. For example, as shown in FIG. 1, the first executing program 106a may transmit data packets to directly to the second executing program 106b.

Figure 2B:
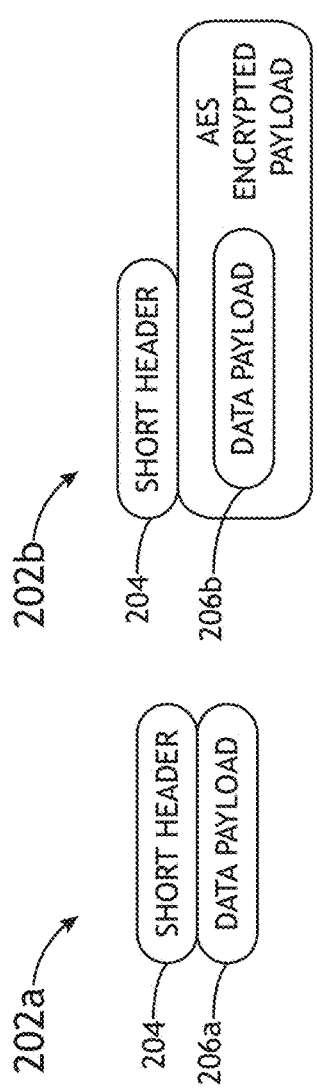
FIG. 2B illustrates a first stage handshake data packet of a stage automation system, in accordance with one or more embodiments of the present disclosure.

FIG. 2B illustrates a first stage handshake data packet 202b of a stage automation system 100, in accordance with one or more embodiments of the present disclosure. The first stage handshake data packet 202b may include, but is not limited to, a short header 204, a long header 208, and a data payload 206b.

Once two components have received one another's public RSA keys, the two components may exchange first stage handshake data packets 202b. As noted previously herein, the short header 204 may be transmitted unencrypted, and repeated fully in the encrypted portion of the data packet. In embodiments, the data payload 206b may include an AES symmetric key of the sending component. In this regard, exchanging first stage handshake data packets 202b may allow various components to securely handshake and exchange AES symmetric keys with one another.

Figure 2C:
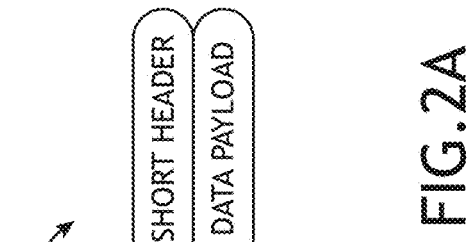
FIG. 2C illustrates a second stage handshake data packet of a stage automation system, in accordance with one or more embodiments of the present disclosure.

FIG. 2C illustrates a second stage handshake data packet 202c of a stage automation system 100, in accordance with one or more embodiments of the present disclosure. The second stage handshake data packet 202c may include, but is not limited to, a short header 204, a long header 208, and a data payload 206c.

Once two components have received one another's AES symmetric keys, the two instances may transmit a series of second stage handshake data packets 202c. Second stage handshake data packets 202c may be transmitted between components in order to judge network latency and jitter between the respective components. In embodiments, the long header 208 may include timing information (e.g., timecode or runtime configuration of sending component), and may be included within all subsequent data packets in order to continually monitor network latency and other conditions/characteristics of the network protocol. After AES symmetric keys have been exchanged and a communicative coupling has been established between components of the stage automation system 100, data payloads 206c exchanged between the components may be trusted and acted upon.

While FIGS. 2A-2C are shown and described in the context of RSA/AES encryption algorithms, these are not to be regarded as a limitation of the present disclosure, unless noted otherwise herein. In this regard, the stage automation system 100 may be configured to utilize any encryption algorithms or schemes known in the art without departing from the spirit and scope of the present disclosure.

In embodiments, a component may be configured to transmit one or more update data packets (e.g., "XaValuesUpdate" data packets) when a value of one or more time-stamped variables associated with the component is adjusted or updated. For example, if a position of the actionable mechanism 104a is updated, the first executing program 106a may transmit one or more update data packets to the stage automation server 108. The stage automation server 108 may then be configured to forward the one or more update packets to one or more additional executing programs 106b-106n which subscribe/depend upon the updated value. A database of components (e.g., executing programs 106) which subscribe/depend on the updated value may be stored in memory 112. In this example, the one or more executing programs 106 may then update distributed program objects associated with the updated time-stamped variable based on the one or more received update packets. Example update data packets which may be transmitted throughout the stage automation system 100 via the network protocol is shown in Table 4 and Table 5 below.

TABLE 4

Update Data Packet Structure

| Starting Byte | Bytes | Value Type | Content |
|---|---|---|---|
| 0 | 16 | UUID | Time-stamped variable UUID for example Value 1 |
| 16 | 1 | Byte | Value type for Value 1. This is redundant, since the receiving executing program should know what value type that time-stamped variable UUID is, but this additionally helps reduce speed of decoding and prevents accidental buffer overruns that would cause the decoding process to miss other valid data. For this example, we'll assume the value type of Long, which is a signed integer that is stored with 4 bytes per value |
| 17 | 2 | UInt16 | Number of time-stamped variable slices that are included after this (e.g., 3 slices) |
| 19 | 8 | Double | Slice 1: Timecode |
| 27 | 8 | Long | Slice 1: Value |
| 35 | 8 | Double | Slice 2: Timecode |
| 43 | 8 | Long | Slice 2: Value |
| 51 | 8 | Double | Slice 3: Timecode |
| 59 | 8 | Long | Slice 3: Value |
| 67 | 16 | UUID | Value type UUID for example Value 2 |
| 83 | 1 | Byte | Value type for Value 2 |
| 84 | 2 | UInt16 | Number of time-stamped variable slices that are included after this (e.g., 3 slices) |
| 86 | 8 | Double | Slice 1: Timecode |
| 94 | 8 | Long | Slice 1: Value |
| 102 | 8 | Double | Slice 2: Timecode |
| 110 | 8 | Long | Slice 2: Value |
| 118 | 8 | Double | Slice 3: Timecode |
| 126 | 8 | Long | Slice 3: Value |

TABLE 5

Update Data Packet Structure

| Starting Byte | Bytes | Value Type | Content |
|---|---|---|---|
| 0 | 16 | UUID | Time-stamped variable UUID for example Value 1 |
| 16 | 1 | Byte | Value Type (e.g., String) |
| 17 | 2 | UInt16 | Number of time-stamped variable slices that are included after this (e.g., 3 slices) |
| 19 | 8 | Double | Slice 1: Timecode |
| 27 | 2 | UInt16 | Slice 1: Value |
| 29 | 17 | Byte | Slice 2: Timecode |
| 46 | 8 | Double | Slice 2: Value |
| 54 | 2 | UInt16 | Slice 3: Timecode |
| 56 | 635 | Byte | Slice 3: Value |
| 691 | 16 | UUID | Time-stamped variable UUID for example Value 1 |
| 707 | 1 | Byte | Value Type (e.g., Bool) |
| 708 | 2 | UInt16 | Number of time-stamped variable slices that are included after this (e.g., 3 slices) |
| 710 | 8 | Double | Slice 1: Timecode |
| 718 | 1 | Bool | Slice 1: Value |
| 719 | 8 | Double | Slice 2: Timecode |
| 727 | 1 | Bool | Slice 2: Value |
| 728 | 8 | Double | Slice 3: Timecode |
| 736 | 1 | Bool | Slice 3: Value |

In particular, Table 4 illustrates an update data packet storing multiple time-stamped variable slices (e.g., multiple time-stamped variables for various points in time) for two time-stamped variables including long integer value types, and Table 5 illustrates an update data packet storing multiple time-stamped variable slices for two time-stamped variables including a string value type and a bool value type.

It is noted herein that transmitting update data packets throughout the stage automation system 100 upon updating a time-stamped variable may allow each component of the system to maintain up-to-date information regarding other components, such as a location, velocity, operational status, and the like. It is further noted herein that the size of update data packets may be limited to the maximum transmission unit (MTU) of the network, less the known length of the short header 204 used throughout the stage automation system 100. Once a byte count of the data payload of an update data packet (or other data packet) reaches a maximum length, the respective data packet may be transmitted, and a new data packet including remaining bytes to be transmitted may be constructed.

Figure 3A:
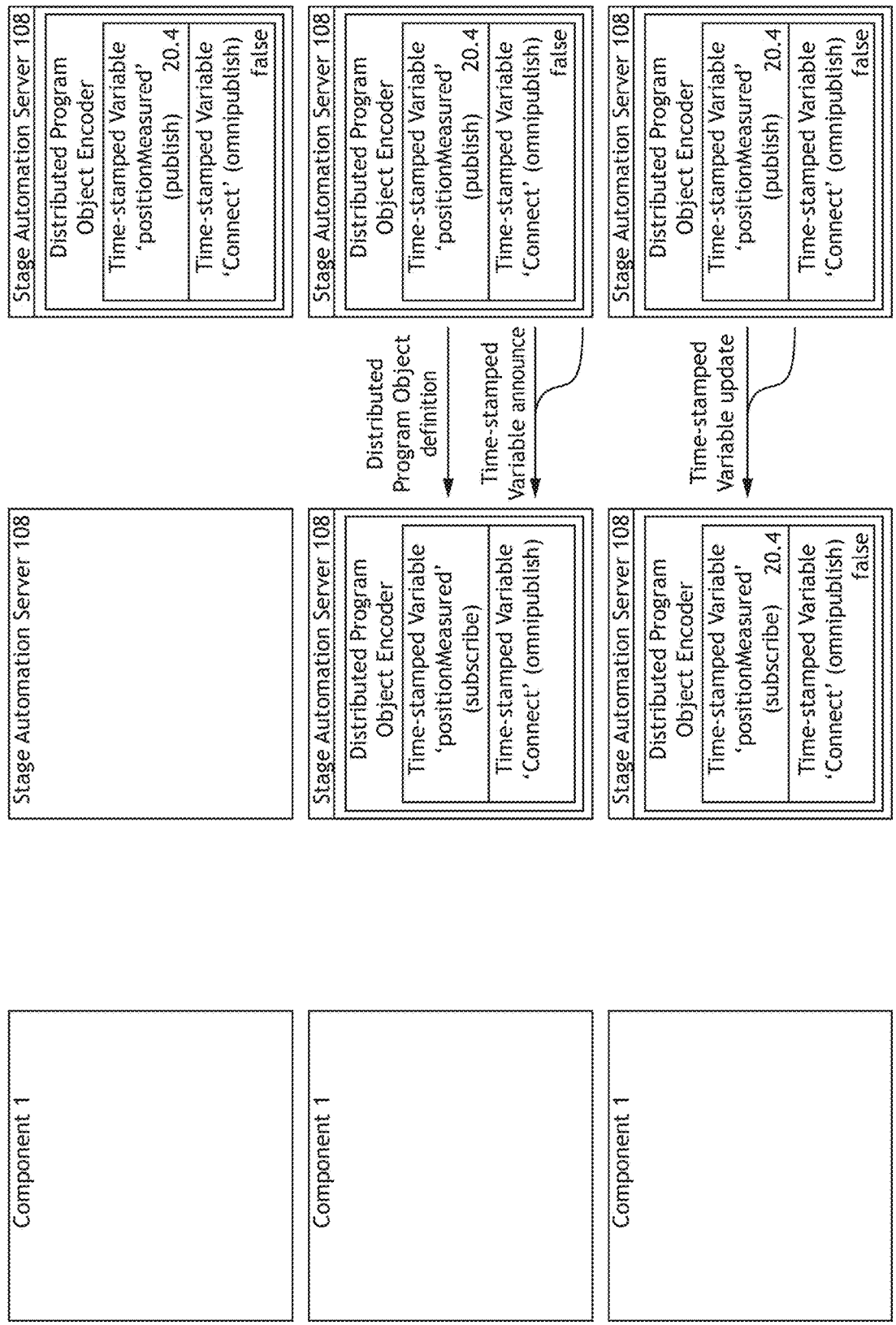
FIGS. 3A-3C illustrate a conceptual diagram of a time-stamped variable with a publish variable mode and a time-stamped variable with an omni-publish variable mode, in accordance with one or more embodiments of the present disclosure.
Figure 3B:
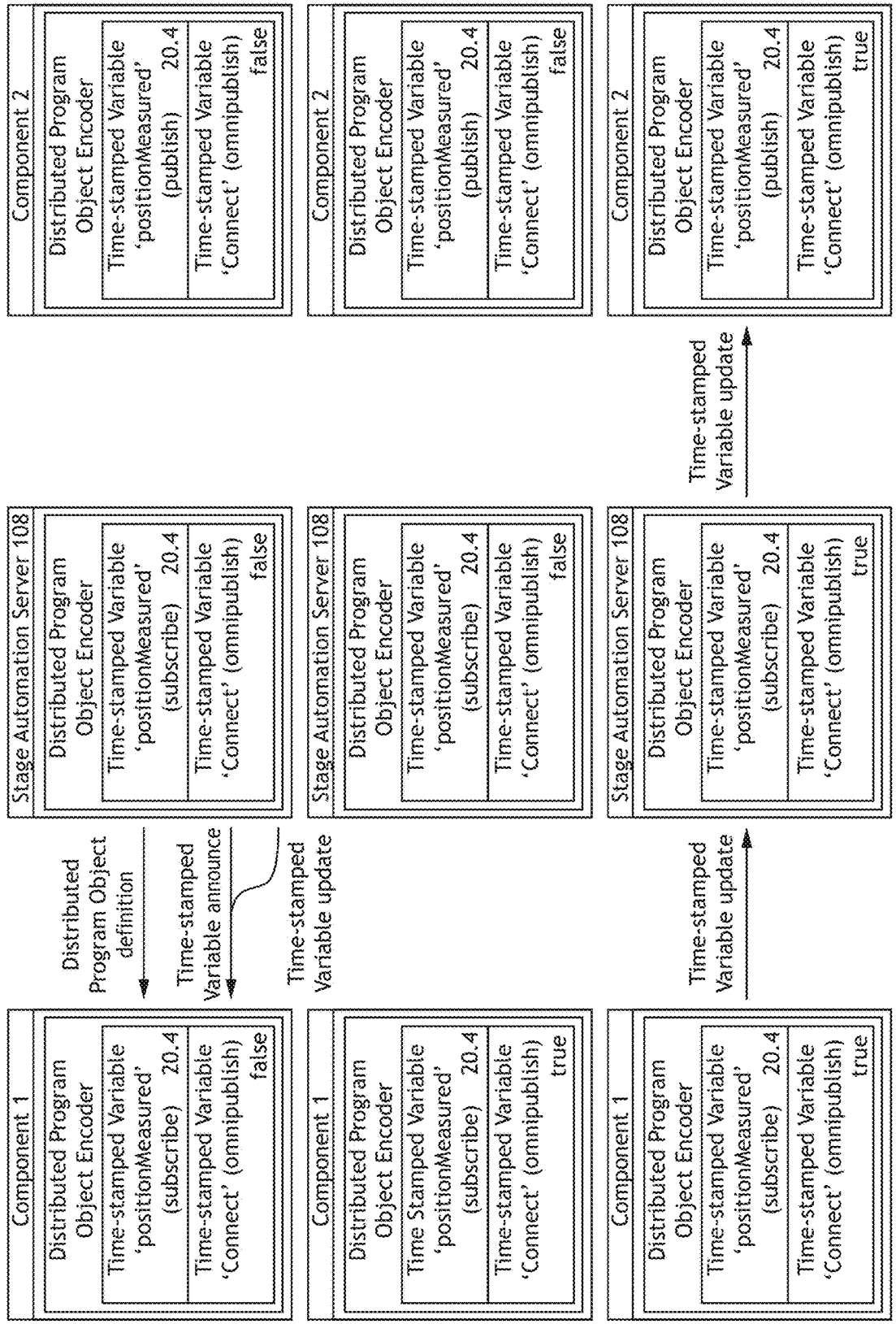
Figure 3C:
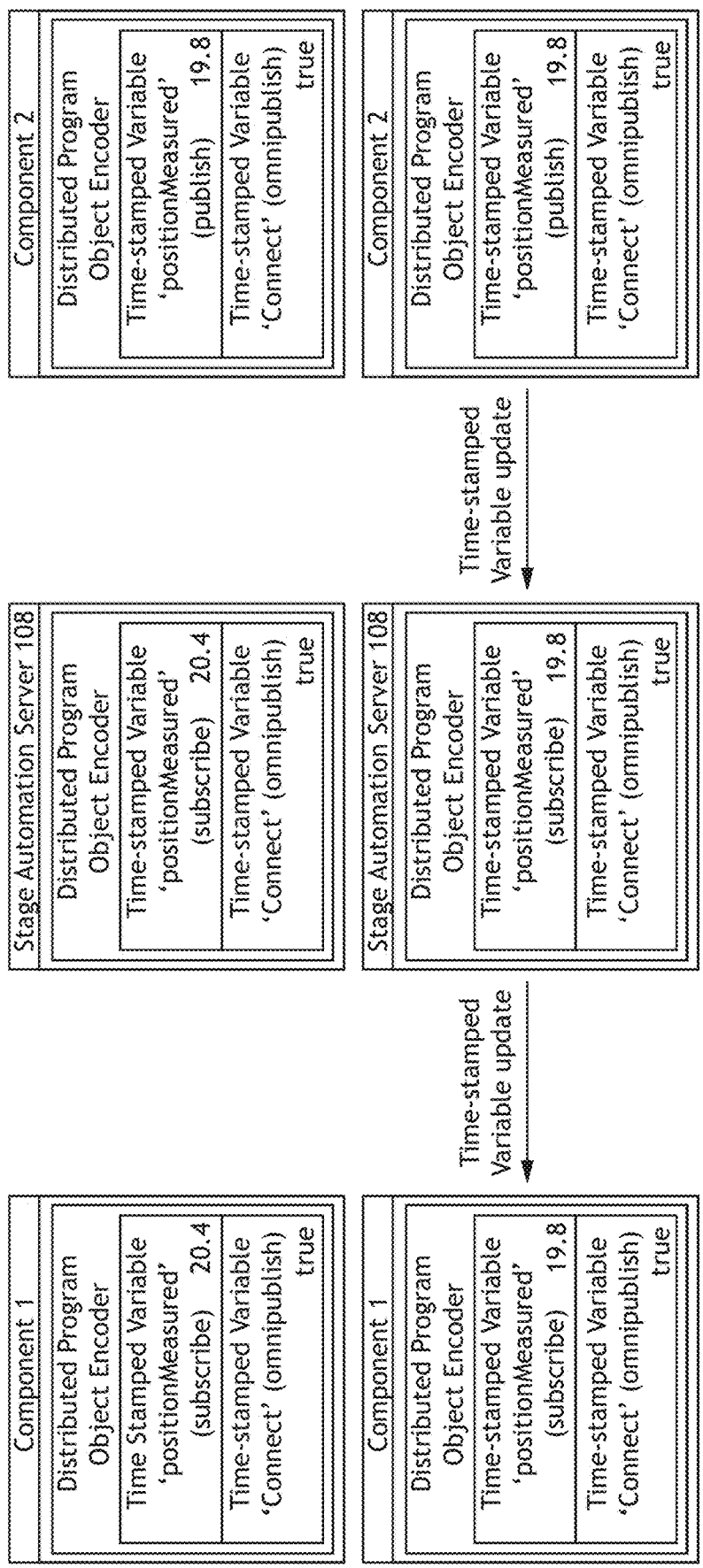

FIGS. 3A-3C illustrate a conceptual diagram of a time-stamped variable with a publish variable mode and a time-stamped variable with an omni-publish variable mode, in accordance with one or more embodiments of the present disclosure. In particular, FIGS. 3A-3C illustrate a first component (Component 1) subscribing to a first time-stamped variable of a second component (Component 2), and updating a second time-stamped variable of the second component (Component 2).

For example, as shown in FIG. 3A, a second component (Component 2) (e.g., actionable mechanism 104*d*, executing program 106*b*) may transmit a distributed program object announcement to the stage automation server 108 including a first time-stamped variable with a publish variable mode and a second time-stamped variable with an omni-publish variable mode. The stage automation server 108 may receive the distributed program announcement, and generate/store the distributed program announcement of Component 2 in memory. The distributed program object announcement may only include the names of the time-stamped variables, variable modes, and value types. Subsequently, Component 2 may transmit update data packets (e.g., updated time-stamped variables) which include actual values for each time-stamped variable. As shown in FIG. 3B, a first component (Component 1) (e.g., user interface 114, actionable mechanism 104*d*, executing program 106*b*) may subscribe to the distributed program object of Component 2 such that it may view the values of the time-stamped variables. Subsequently, Component 2 may update the value of the second time-stamped variable with an omni-publish variable type, and transmit update data packets to Component 2, thereby adjusting one or more characteristics of Component 2. Conversely, in FIG. 3A, Component 2 may update the first time-stamped variable, and update data packets may be transmitted to Component 1 reflecting the change.

In embodiments, one or more executing programs 106*b*-106*n* may receive one or more data packets from the second executing program 106*b*. In additional embodiments, one or more executing programs 106*a*-106*n* may be configured to adjust one or more time-stamped variables with an omni-publish value type. For example, the first executing program 106*a* may include a motor as a first actionable mechanism 104*a*. The motor may include a distributed program object including a time-stamped variable indicative of an output of the motor, and the motor may be characterized by an omni-publish value type such that other components of the system may adjust/update the motor output. In this example, a second executing program 106*b* may subscribe to and/or receive the distributed program object of the motor (e.g., first actionable mechanism 104*a*), adjust the time-stamped variable indicative of motor output to a new output, and transmit one or more data packets including the updated distributed program object and/or updated time stamped variable to the first executing program 106. The one or more data packets may be configured to cause the first executing program 106*a* to adjust the time-stamped variable of the motor (e.g., first actionable mechanism 104*a*) of the motor's distributed program object in response to the received data packets. In this regard, the first executing program 106*a* is configured to adjust one or more operational characteristics (e.g., motor output) of the first actionable mechanism 104*a* associated with the at least one adjusted time-stamped variable.

Continuing with the same example above, upon receiving the one or more data packets including the updated distributed program object and/or updated time stamped variable, the stage automation server 108 may also be configured to update the time-stamped variable of the motor stored in memory 112 based on the received data packets which may be forwarded to the first executing program 106*a*.

It is noted herein that selectively adjusting and controlling characteristics of components within the stage automation system 100 via distributed program objects may enable much greater flexibility and robustness than is currently possible using conventional systems.

An example may prove to be illustrative. consider a conventional stage automation system which includes a first microwave from Manufacturer A. In order to start the first microwave, a user must select the "Cook" button, then select the "Time Cook" button, enter a time, then press and hold a "Start" button for two seconds. The conventional stage automation system may further include a second microwave from Manufacturer B. In order to start the second microwave, a user must enter a time, select the "Cook" button, then press and release a "Start" button. In order to remotely control the first and second microwaves via a server/controller, the server/controller would have to be programmed specifically for Manufacturer A and Manufacturer B separately such that it performs the right steps, in the right order, in the right format, and the like. This specific programming would be individualized on a manufacturer and product basis. Such bespoke programming may be tedious and time consuming, which leads to a lack of compatibility and communication between components of the conventional stage automation system.

Comparatively, consider the same example with the first and second microwaves in the context of the stage automation system 100. Upon introduction into the environment of the stage automation system 100, each microwave may generate and transmit a distributed program object announcement. The distributed program object of each microwave may include a time-stamped variable with value type string indicating the type/name of the microwave (e.g., "CookMeister500Microwave," "GEJES1072SHMicrowave") which will be unique to each microwave. Additionally, the distributed program object of each microwave may allow other components update the cook timer (e.g., time-stamped variable, double, publish), may publish the operational state (on/off) of the respective microwave (e.g., time-stamped variable, boolean, publish), publish the internal temperature (e.g., time-stamped variable, double, publish), and allow other components to turn on the microwave (e.g., time-stamped variable, boolean, omni-publish). Upon receiving the distributed program object of the respective microwaves, interested/dependent components may save/generate the distributed program object which will listen/view to the temperature of the microwaves, and listen/view in order to update/adjust the cook timer and on/off status. For instance, in order to turn on either microwave, all another component would have to do is update the time-stamped variables associated with the cook timer and on/off status and transmit update data packets including an updated distributed program object to the respective microwave. Each respective microwave may then be configured to receive the updated distributed program objects, and adjectively alter the cook time and on/off status of the microwave based on the updated distributed program object and the manufacturer As illustrated in the example above, controlling/adjusting characteristics of components within the stage automation system 100 via distributed program objects may enable much greater flexibility. In particular, distributed program objects may render manufacturer-specific processes and instructions to be generic for all components/machines of a particular type. For instance, updating an on/off status via a distributed program object may be similar for all microwaves, no matter the manufacturer or manufacturer-specific program instructions. In other words, the stage automation system 100 may utilize generic updates to distributed program objects to implement manufacturer-specific programming. Controlling a component within the stage automation system 100 therefore focuses on the type of the component (as defined by its distributed program object), and not the manufacturer or individual machinery associated with the component. In this regard, embodiments of the present disclosure may enable a stage assembly system 100 which is hardware and protocol agnostic.

By way of another example, the processes used to release the brake and trigger a velocity change in a Nidec M750 servo drive is very different from that of a Kollmorgen AKD-BASIC servo drive. Distributed program objects would include names (value type string) indicating the different servo drives. However, the distributed program objects of both servo drives would include similar and/or identical time-stamped variables (e.g., on/off status, voltage, current, output), making the distributed program objects of each specific servo drive appear to be a generic distributed program object for any servo drive (minus the name within each distributed program object)

It is further noted herein that allowing components of the stage automation system 100 to selectively adjust characteristics of other components within the environment of the stage automation system 100 may enable increasingly automated events and performances (e.g., concerts, plays, and the like). For example, during a concert, three separate actionable mechanisms 104a-104c may be required to perform their designated actions before a fourth actionable mechanism 104d is to be activated to perform its designated actions. In this example, upon performing its designated actions (e.g., actuating to correct location, producing light, etc.), the first actionable mechanism 104a may update a distributed program object of the second actionable mechanism 104b, causing the second actionable mechanism 104b to perform its designated actions. Upon performing its designated actions (e.g., actuating to correct location, producing light, etc.), the second actionable mechanism 104b may update distributed program objects of the third and fourth actionable mechanisms 104c-104d, causing the third and fourth actionable mechanisms 104c-104d to perform their designated actions.

In embodiments, updates to time-stamped variables and/or distributed program objects are written in real-world units, such that the position, velocity, acceleration, and the like, of each component of the stage automation system 100 is known with respect to 3D space. As noted previously, positional information (e.g., position, velocity, acceleration, deceleration, position clamps, and the like) may be selected and stored within the system with respect to a defined reference point.

In some embodiments, actions performed within the stage automation system 100 may be limited or controlled by "conditions." The term conditions may be used to refer to logic statements which limit actions and/or cause certain actions to occur within an environment. For example, a condition may state that if a certain time-stamped variable or statement of time-stamped variable comparisons is true, limit the velocity of actionable assembly 102a to 1 m/s. By way of another example, a condition may be configured to fire a command (e.g., update a time-stamped variable to initiate an action) on the rising edge of a certain time-stamped variable. In embodiments, a database of conditions associated with an environment may be stored in memory 112 of the stage automation server 108 and/or memory of components within the stage automation system 100.

In some embodiments, a show or event (e.g., concert, play, sporting event) may be programmed in terms of cue sheets, cues, and commands. A cue sheet may be stored in memory 112, wherein the cue sheet includes a list of one or more cues and/or commands. A command may be used to refer to an action which an actionable mechanism 104 and/or actionable assembly 102 may take. For example, commands may include "move to x position," "sync position with another actionable mechanism 104 and/or actionable assembly 102," move to x velocity and hold x velocity," move along a predefined series of positions or velocities," "follow the position value passed via Open Sound Control (OSC) or Art-Net," "wait x seconds, then move to y position," and the like. A cue may be used to refer to multiple actions which are executed on one or more actionable mechanisms 104 and/or actionable assemblies 102. Thus, a cue may refer to a group of one or more commands.

In practice, a memory 112 of the stage automation server 108 may be configured to store a cue sheet including a plurality of cues and/or commands, often the cues/commands for an entire show. For example, the stage automation server 108 may be configured to store a cue sheet in memory, wherein the cue sheet includes a first command executable by the first actionable mechanism 104a, and a second command executable by the second actionable mechanism 104b. Cues and commands may be linked to the particular component (e.g., actionable assembly 102, actionable mechanism 104, executing program 106) configured to execute them based on the UUID of the respective component.

For instance, the stage automation server 108 may be configured to transmit one or more data packets associated with a first command to the first executing program 106a, wherein the first executing program 106a is configured to adjust at least one time-stamped variable of a first actuatable mechanism 104a in order to execute the first command. The stage automation server 108 may be further configured to transmit one or more data packets associated with the second command to the second executing program 106b, wherein the second executing program 106b is configured to adjust at least one time-stamped variable of the second actuatable mechanism 104d in order to execute the second command.

The stage automation server 108 may include a "CueManager." The CueManager may include a module or a set of program instructions executable by the one or more processors 110. The CueManager may be configured to hold commands which are currently running in a position denoted "CommandExecutor," and commands which are to be run subsequently in a position denoted "CommandStandby." To initiate a cue or command, the CueManager may receive a UUID of an existing cue or command. The CueManager may then make a copy of the cue/command, and put its contents into CommandStandby position. For each executing program 106 in the environment, the CueManager may be configured to take the first cue/command in the CommandStandby position and move it to the CommandExecutor position in order to initiate/execute the cue/command on its intended executing program. Once the cue/command in the CommandExecutor position completes, the CueManager may remove it from the CommandExecutor position, and move the next cue/command (if any) from the CommandStandby position in to the CueExecutor position.

In embodiments, some cues/commands may keep a component (e.g., executing program 106, actionable mechanism 104, actionable assembly 102) active until certain criteria or conditions are met. For example, a command may keep a component active until a timer has expired, a position of another component is met, or a particular time-stamped variable reaches a particular value. In this regard, the CueManager (e.g., stage automation server 108) may not deactivate a command in the CommandExecutor position until the command is complete. In other embodiments, some components may be put into a fixture mode to be controlled by a lighting console or other external control. For example, some components may be put into a fixture mode such that they are controlled via the user interface 114. Commands in a fixture mode may stay active until they are manually cleared. The stage automation server 108 of the environment may listen to the Art-Net/Streaming Architecture of Control Networks (sACN) universe/multiverse for transporting frames in the DMX universe/multiverse, and can make executing programs 106 respond to live commands to chase a position command from Art-Net. Each executing program 106 may include a starting address in the DMX multiverse and the OSC namespace.

As shown in FIG. 1, the stage automation system 100 may further include a user interface 114. The user interface 114 may include a user input device 1167 and a display device 118. The user interface 114 may include any user interface device known in the art including, but not limited to, a desktop computer, a laptop, a mobile device (e.g., smartphone, tablet), a wearable device, and the like. The display device 118 may be configured to display data/information of the stage automation system 100 to a user. In this regard, a user may be able to view characteristics of components within the stage automation system 100 (e.g., distributed program objects, time-stamped variables for position, velocity, operational state, and the like) via the user interface 114.

In embodiments, the user input device 116 may be configured to receive one or more input commands from a user responsive to data shown on the display device 118. For example, a user may be able to input various commands, conditions, and the like, via the user interface 114. By way of another example, a user may be able to run components (e.g., actionable assemblies 102, actionable mechanisms 104) of the stage automation system 100 in a "jog mode." The term "jog" may be used to refer to user-controlled actions (e.g., user-input position, user-input velocity, user-input command to move forward or backwards). For example, an executing program 106 may be run in a jog mode, live-chasing either a position, velocity, or torque target with minimum/maximum position clamps, velocity clamps, and acceleration clamps set by settings of the executing program 106, parameters associated with a command, or a defined condition. Actions of a particular component may be limited to whichever parameters (e.g., executing program 106 settings, parameters associated with a command, a defined condition) are most restrictive.

For instance, the stage automation server 108 may be configured to receive one or more input commands (e.g., data packets) from a user interface 114, and adjust at least one time-stamped variables of a set of one or more time-stamped variables of a distributed program object stored in memory 112 based on the one or more input commands received from the user interface 114. Subsequently, the stage automation server 108 may be configured to transmit one or more update data packets to the component associated with the updated distributed program object in order to implement the action, command, or condition based on the received input commands.

In some embodiments, the stage automation system 100 may implement the DMX multiverse which receives data in and transmits data out to a DMX, Art-Net, and/or RDM network. The DMX multiverse may also contain configuration linking UUIDs of various executing programs 106 to starting addresses and fixture styles in the multiverse, a configuration that is static and persistent in the configuration of the environment. In embodiments, an executing program 106 of an environment of the stage automation system 100 may be configured to listen to a DMX512 source (e.g., RS-485, DMX512, Art-Net, DMX over sACN), and transmit the universe values as data packets over the network protocol to the stage automation server 108. The universe values may be timestamped with the time of capture (similar to time-stamped variables), and marked with the UUID of the physical device (e.g., RS-485, DMX512) or the Art-Net universe the values originated from. The multiverse object will by default consume any incoming DMX data from any executing program 106 that has a DMX source configured on it, and will broadcast out any DMX out from the multiverse any DMX output configured in the environment, either by DMX512 or a configured Art-Net/sACN network endpoint.

In embodiments, the stage automation system 100 may be configured to support OSC in and out of the environment of the stage automation system 100. By default, the fixture mode for OSC listens to a predefined address prefix for each actionable assembly 102/actionable mechanism 104, and transmits status on a predefined address prefix. The address prefix can be the UUID of the actionable assembly 102/actionable mechanism 104 or another name. In additional embodiments, the stage automation system 100 may be configured to support PosiStageNet input and output. By default, the system will consume any PSN data on the network and create and update single-point geometry object for each unique tracker fount. It will also publish current point data for all actionable assemblies 102/actionable mechanisms 104 with known 3D positions to the network protocol (e.g., to the stage automation server 108).

In embodiments, a fixture move command may instruct an actionable assembly 102/actionable mechanism 104 to make its best effort to hit a requested position target channel, within set clamps and limits in addition to the ones set in the DMX fixture. Each actionable assembly 102/actionable mechanism 104 has the option to configured a starting DMX multiverse and address, and whether it functions in a "Simplified" or "Complete" mode. This may be further understood with reference to Table 6 and Table 7. Table 6 illustrates a simplified one-dimensional (1D) position jog fixture profile, and Table 7 illustrates a complete one-dimensional (1D) position jog fixture profile.

TABLE 6

Simplified 1D Position Jog Fixture Profile

| Channel | Purpose | Value | Note |
|---|---|---|---|
| 1 | Enable | 255 = enable; 0 = disable | Permits motion for component. Fixture Move Command may optionally activate or deactivate the component depending on component type and setting. |
| 2 | 16-bit position target course | Byte | Combined 16-bit value range is normalized between −32,768 and 32,767, |
| 3 | 16-bit position target fine | UInt16 | representing mm for linear axes, and tenths of degrees for rotational axes. |
| 4 | 8-bit velocity clamp | Double | Value range between 0 and 255 representing cm/sec for linear axes, and degrees/sec for rotational axes. Applies to positive and negative velocity. |
| 5 | 8-bit acceleration clamp | Long | Value range between 0 and 255 representing cm/sec for linear axes, and |
| 6 | 8-bit deceleration clamp | Double | degrees/sec for rotational axes. Applies to positive and negative velocity. |
| 7 | Corruption Check 1 | Long | Evaluation of binary 10101011; component will fault if not set. |
| 8 | Corruption Check 2 | Double | Evaluation of binary 01010100; component will fault if not set. |

TABLE 7

Complete 1D Position Jog Fixture Profile

| Channel | Purpose | Value | Note |
|---|---|---|---|
| 1 | Enable | 255 = enable; 0 = disable | Permits motion for component. In this fixture mode, servo & brake activation will follow the jog mode selection. |
| 2 | Jog mode select | 0 = none; 24 = position; 36 = velocity | None is functionally equivalent to a deactivate request. Position will have the component chase the position target, and velocity will have the component chase the velocity target. |
| 3 | 16-bit position target course | | Combined 16-bit value range is normalized between −32,786 and 32,767, representing mm for linear |
| 4 | 16-bit position target fine | | axes, and tenths of degrees for rotational axes. |
| 5 | 16-bit velocity target course | | Value range between 0 and 255 representing cm/sec for linear axes, and degrees/sec for rotational axes. |
| 6 | 16-bit velocity target fine | | Applies to positive and negative velocity. |
| 7 | 16-bit velocity clamp coarse | | Value range between 0 and 65,534 representing mm/sec for linear axes, |
| 8 | 16-bit velocity clamp fine | | and degrees/sec for rotational axes. Applies to positive and negative velocity. |
| 9 | 16-bit acceleration clamp coarse | | Value range between 0 and 65,534 representing mm/sec$^2$ for linear |
| 10 | 16-bit acceleration clamp fine | | axes, and tenths of degrees/sec$^2$ for rotational axes. |
| 11 | 16-bit deceleration clamp coarse | | |
| 12 | 16-bit deceleration clamp fine | | |
| 13 | 16-bit position limit maximum coarse | | Combined 16-bit value range is normalized between −32,786 |
| 14 | 16-bit position limit maximum coarse | | and 32,767, representing mm for linear axes, and tenths of degrees for |
| 15 | 16-bit position limit minimum coarse | | rotational axes. |
| 16 | 16-bit position limit minimum coarse | | |
| 17 | Corruption Check 1 | 171 | Evaluation of binary 10101011; component will fault if not set. |

TABLE 7-continued

Complete 1D Position Jog Fixture Profile

| Channel | Purpose | Value | Note |
|---|---|---|---|
| 18 | Corruption Check 2 | 84 | Evaluation of binary 01010100; component will fault if not set. |

Figure 4:
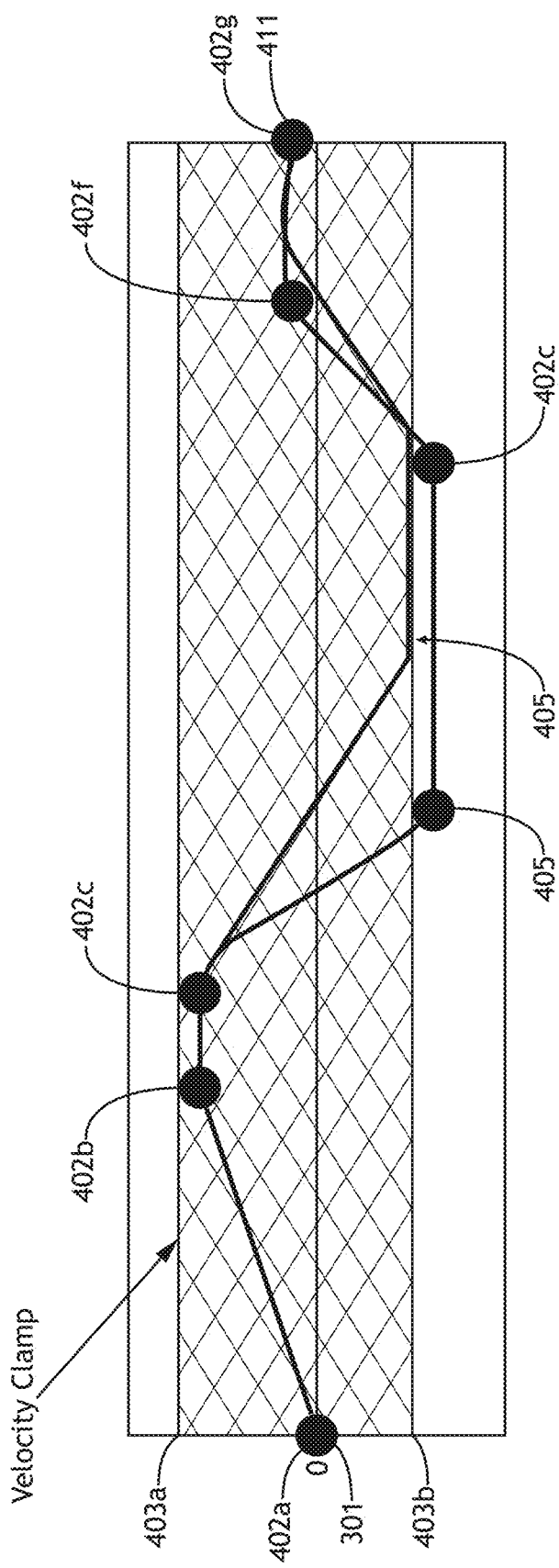
FIG. 4 illustrates a graph 400 depicting position and velocity limits of a component executing commands, in accordance with one or more embodiments of the present disclosure.
Figure 5:
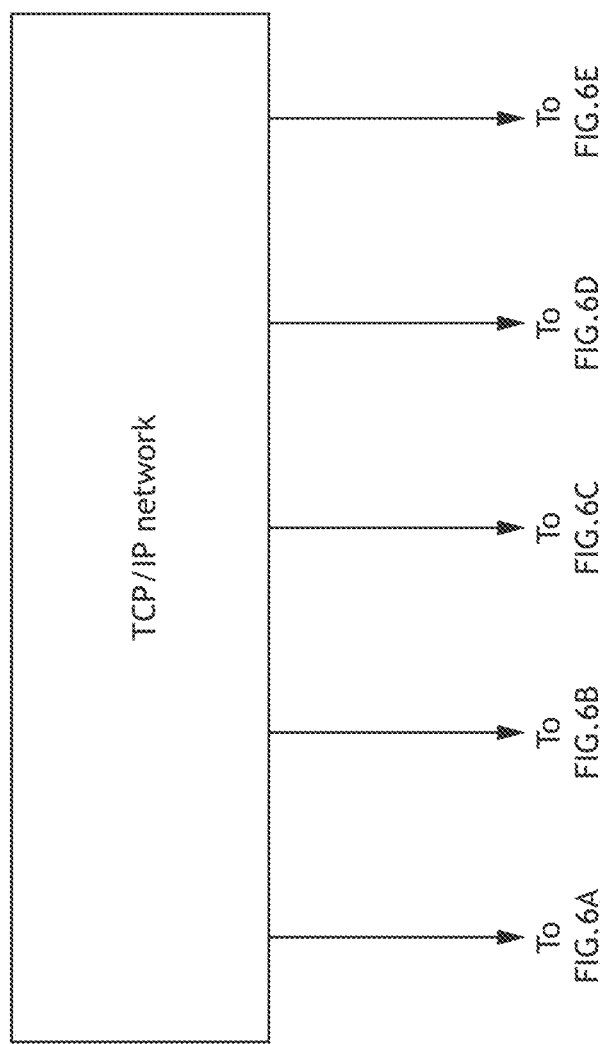
FIG. 5 illustrates a conceptual diagram of a stage automation system, in accordance with one or more embodiments of the present disclosure.
Figures 1, 6A:
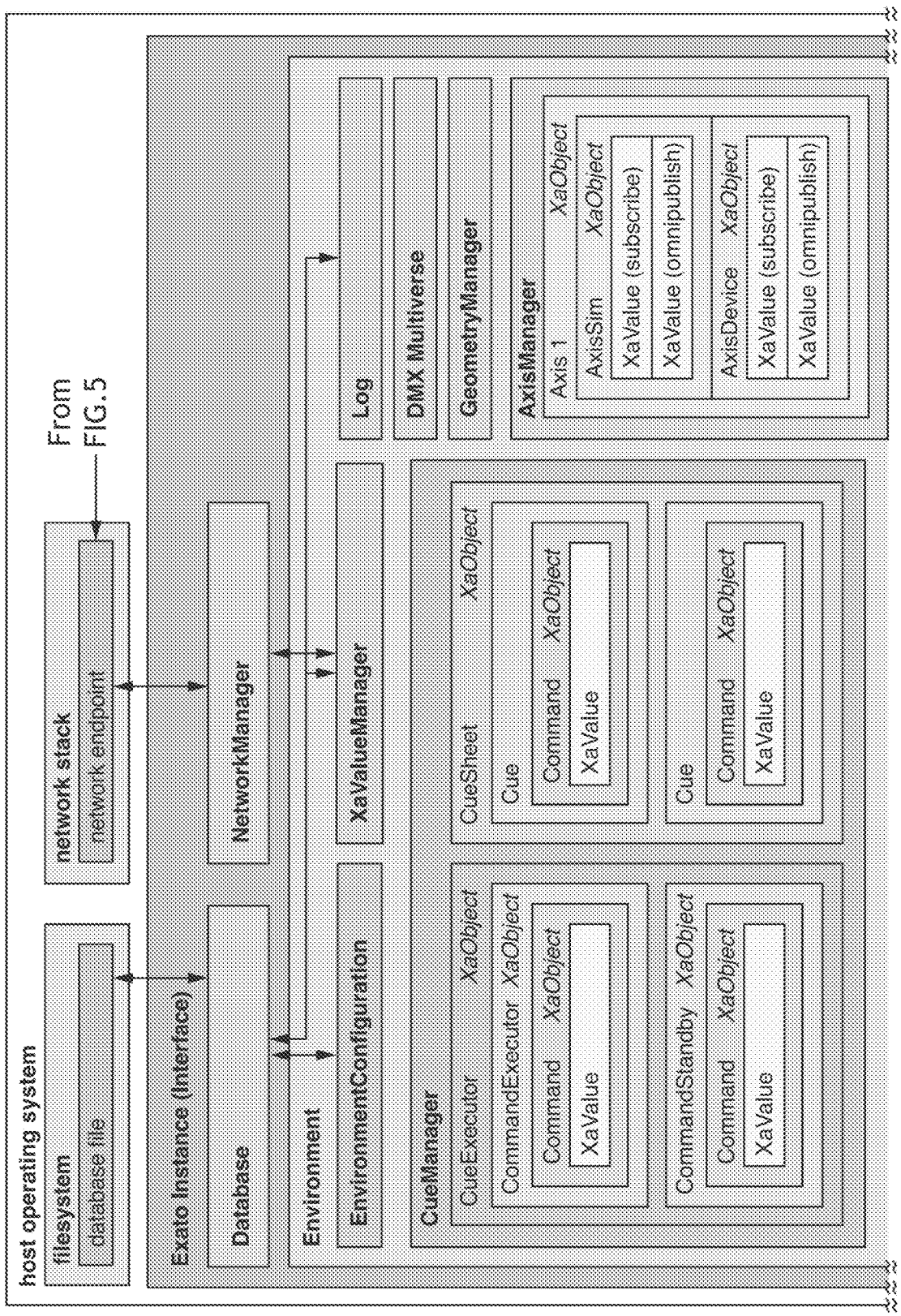
Figures 2, 6A:
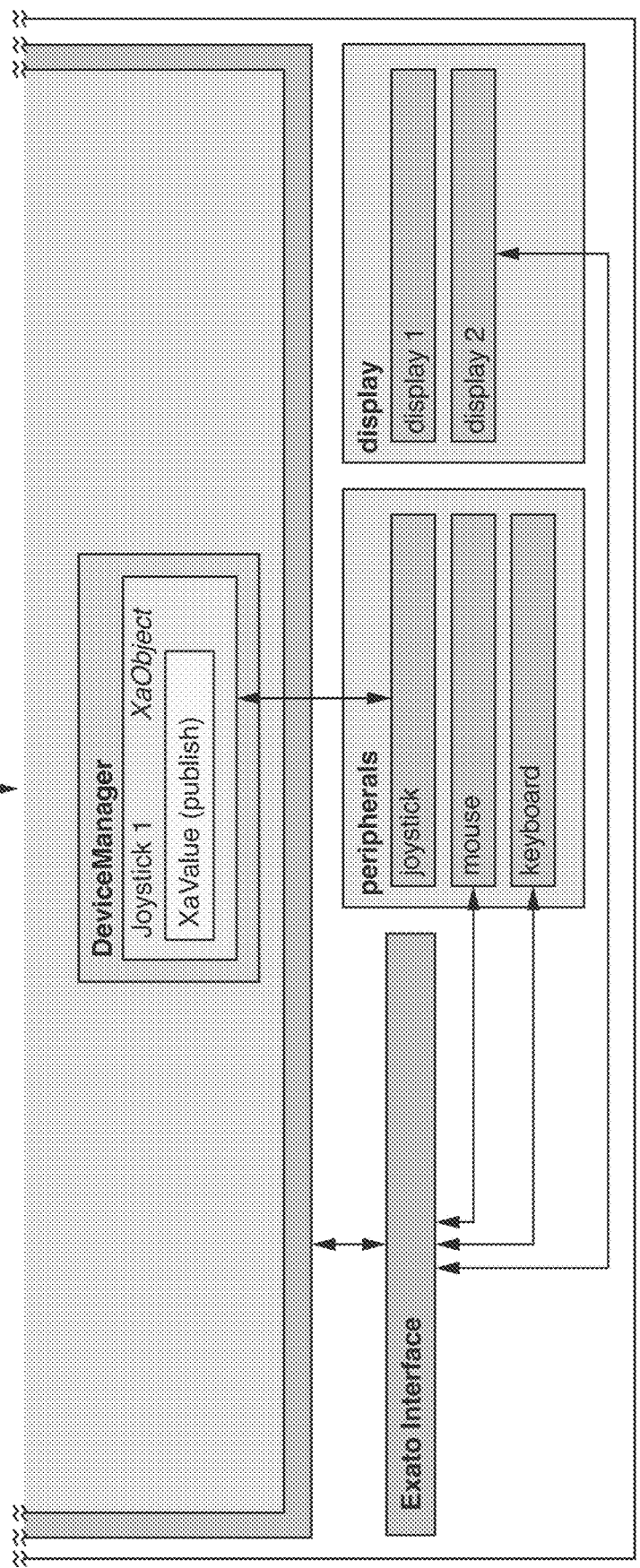
Figures 1, 6B:
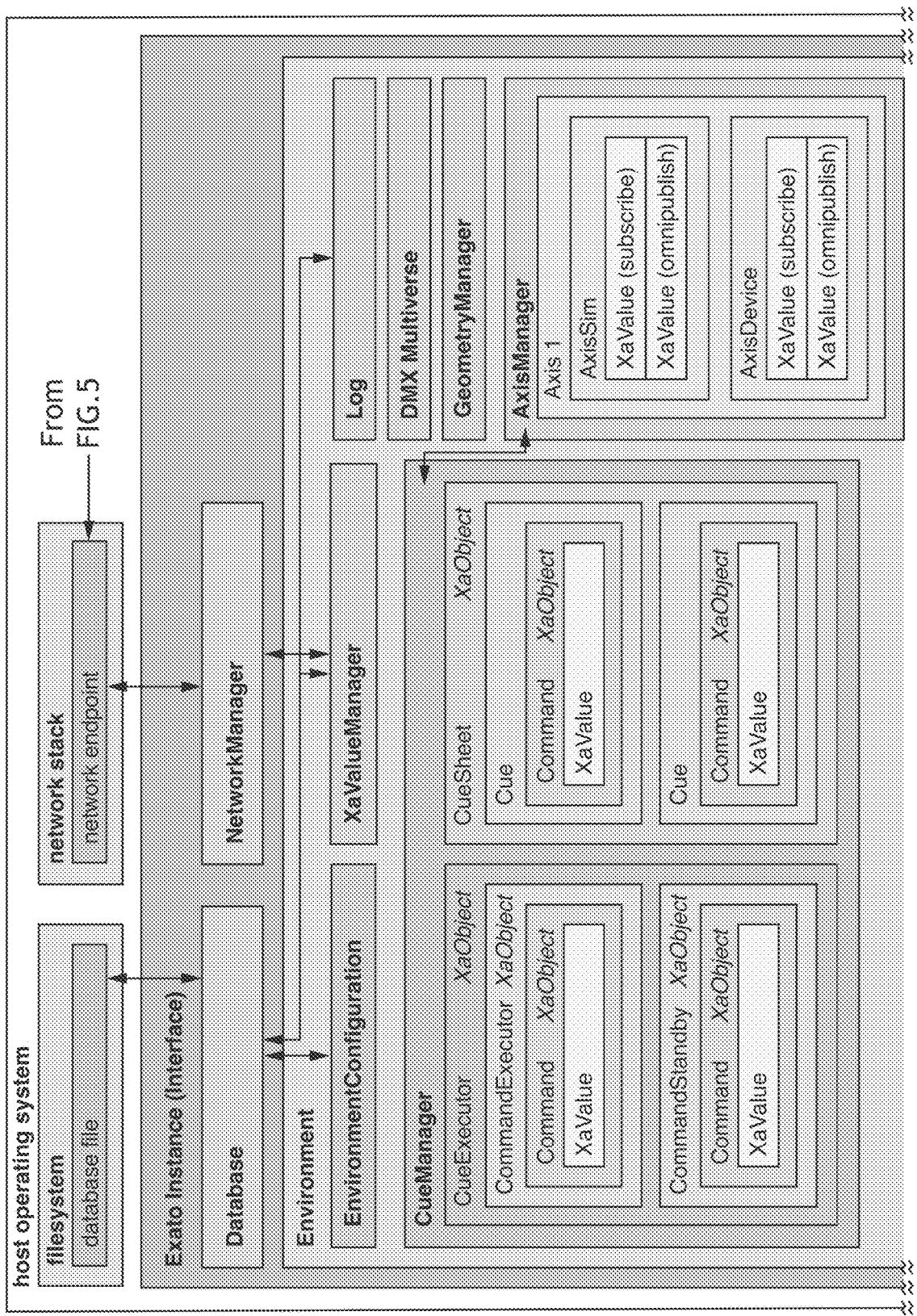
Figures 2, 6B:
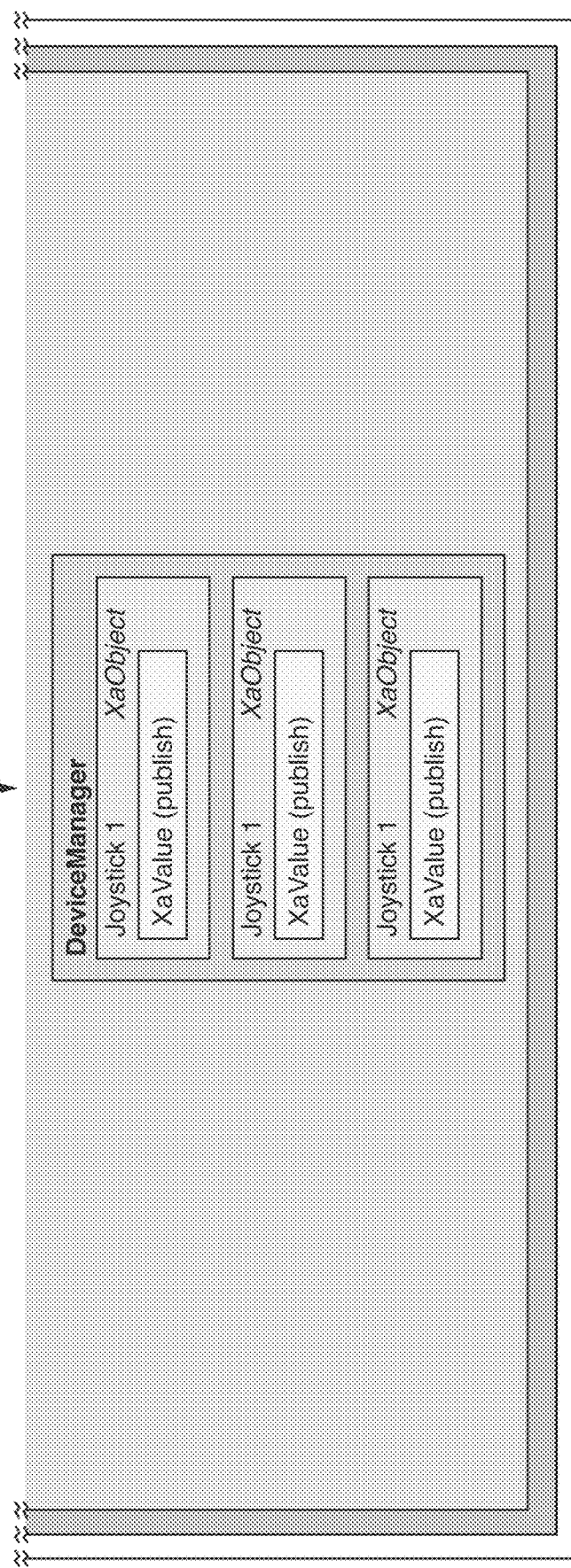
Figure 6C:
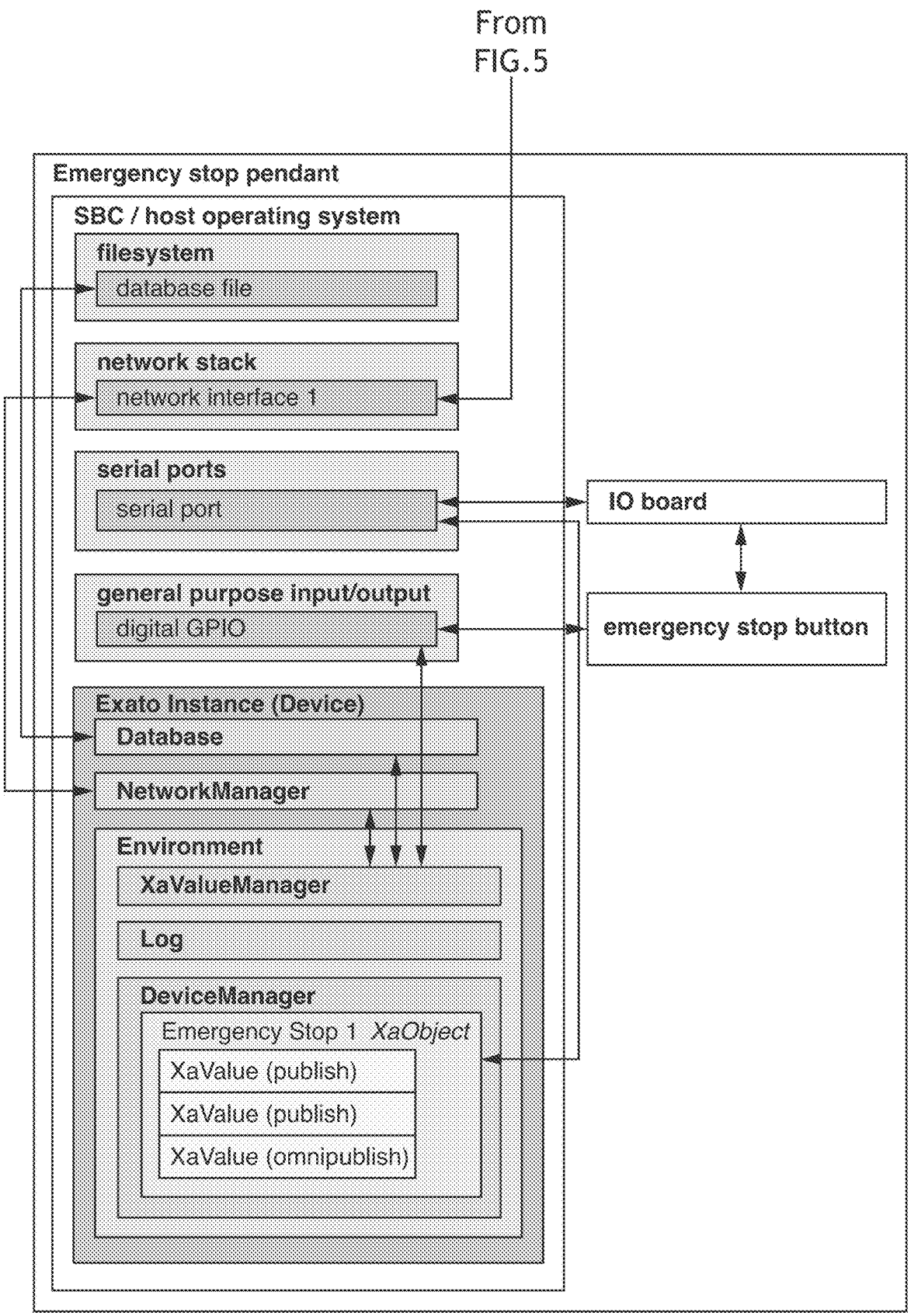
Figure 6D:
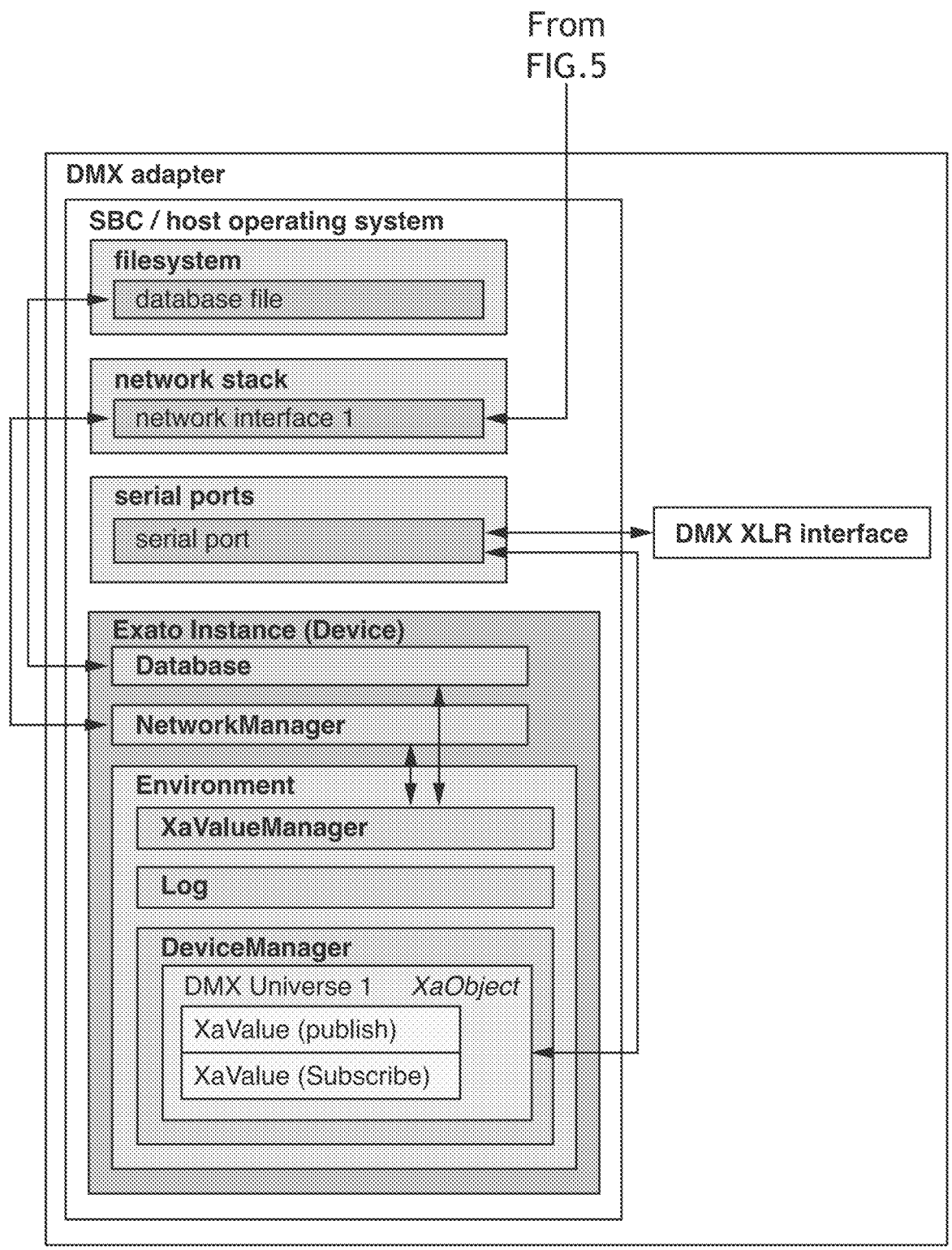
Figures 1, 6E:
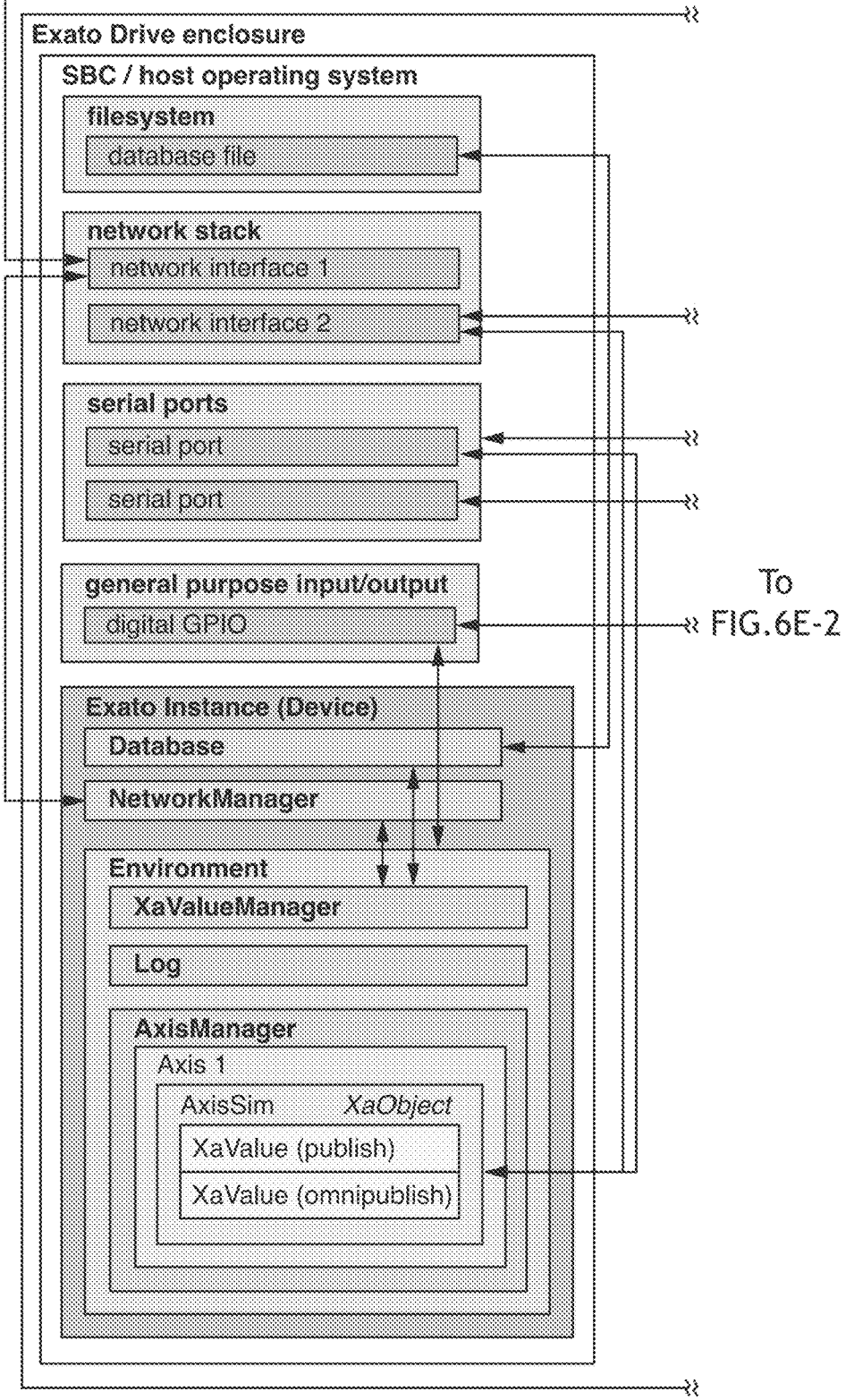
Figures 2, 6E:
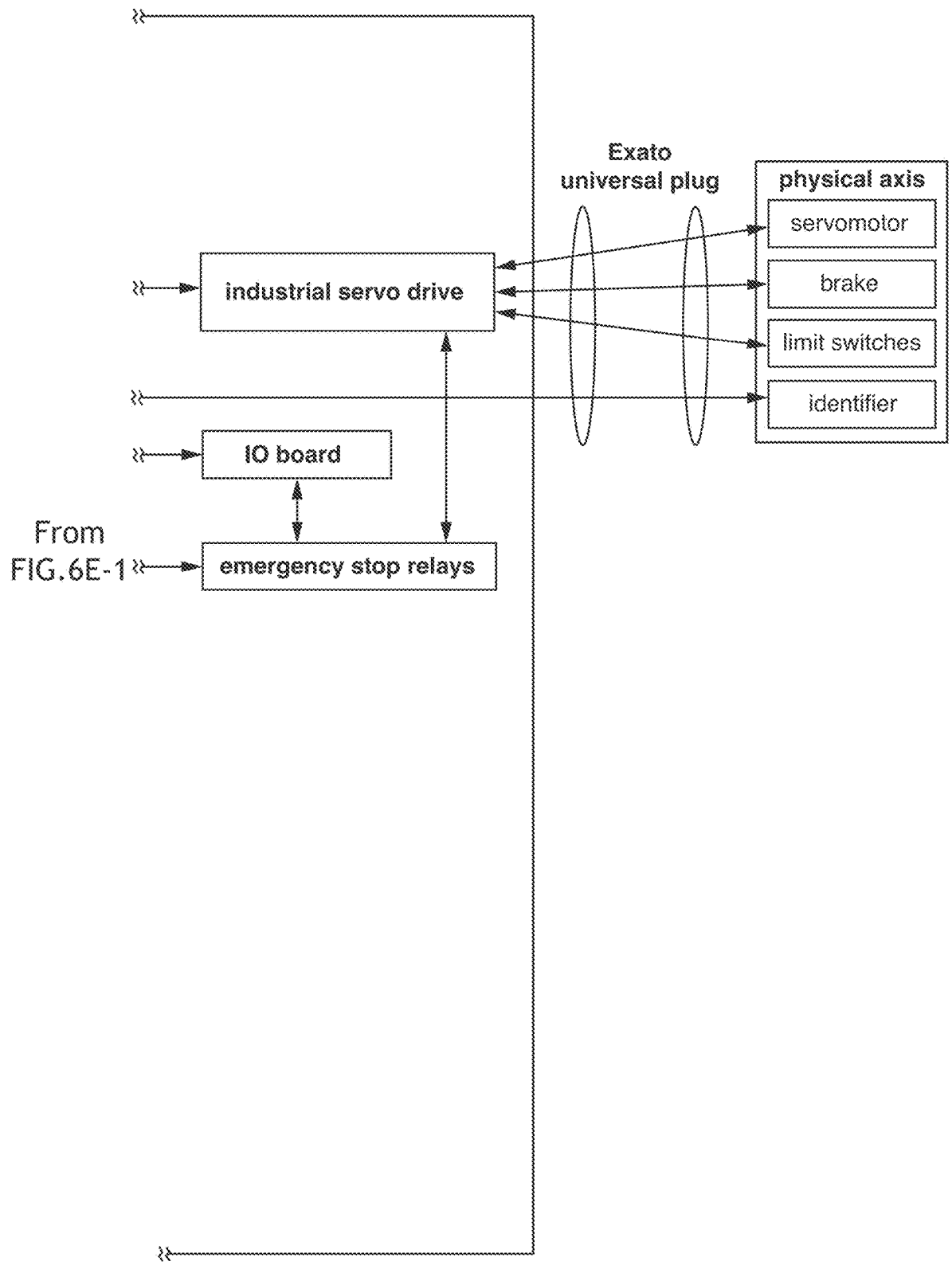

FIG. 4 illustrates a graph 400 depicting position and velocity limits of a component executing commands, in accordance with one or more embodiments of the present disclosure. As noted previously herein, commands and actions implemented by various components (e.g., actionable mechanism 104, actionable assembly 102) may be constrained by various parameters, including condition statements, position clamps, velocity clamps, acceleration/deceleration clamps, and the like.

For example, graph 400 is a visual representation of position of an actionable assembly 102 over time. The actionable assembly 102 may start at an initial start position 301 at an initial time ($t_0$), and end at an end position 311 at a final time ($t_f$). The movement of the actionable assembly 102 may be constrained by a maximum position clamp 403a and a minimum position clamp 403b such that the actionable assembly 102 may not move outside of the respective position clamps 403a, 403b. Additionally, the movement of the actionable assembly 102 may be constrained by a velocity clamps 413 indicated by the slanted/diagonal lines. In embodiments, the graph 400 may be an example depiction of the position of the actionable assembly 102 displayed to a user via the display device 118.

A cue/command for the actionable assembly 102 may include a set of position targets 402a-402n which the actionable assembly 102 is to hit throughout execution of the cue/command. As shown in FIG. 4, if one or more command positions 402d, 402e are outside of the range of values determined by the position clamps 403a, 403b, the actionable assembly 102 may move until the position clamp limit (e.g., minimum position clamp 403b, clamped position target 407), then continue in sync with the intended command positions once the command positions return to the range of values determined by the position clamps 403a, 403b.

In embodiments, the stage automation system 100 may include a 3D geometry system which functions similarly to Cinema 4D/Unity style hierarchies, with parent/child relationships, and additional attributes to an object that can link it to other objects' influence. All components within an environment may have an associated geometry tree. In its simplest configuration, this tree has an origin position & orientation, and a childed object for static geometry, a null object driven by the axis' positionMeasured, and a childed object with the driven geometry. For example, a stage elevator (e.g., actionable assembly 102) may include support structure that would not move, and the orientation for the driven object would be at the top pointing down. Negative position values on the component move the physical platform down to the ground; when the component moves, the 3D object also moves to mimic that. The component also automatically creates representative geometry to show the physical position limits configured on the component. The PSN object has its own associated geometry tree, and it creates & updates child objects for each "show" ID and object ID it receives network data for. Each component (e.g., actionable mechanism 104, actionable assembly 102) by default publishes its origin and driven position to the PSN network, and other geometry objects in the environment hierarchy can also be tagged to send their position out to the PSN network. The stage automation server 108 may contain 3D models for each make/model of component, and models can be imported to attach to custom components.

FIGS. 7A-7E illustrate a three-dimensional (3D) tracking system of a stage automation system, in accordance with one or more embodiments of the present disclosure.

Figure 7A:
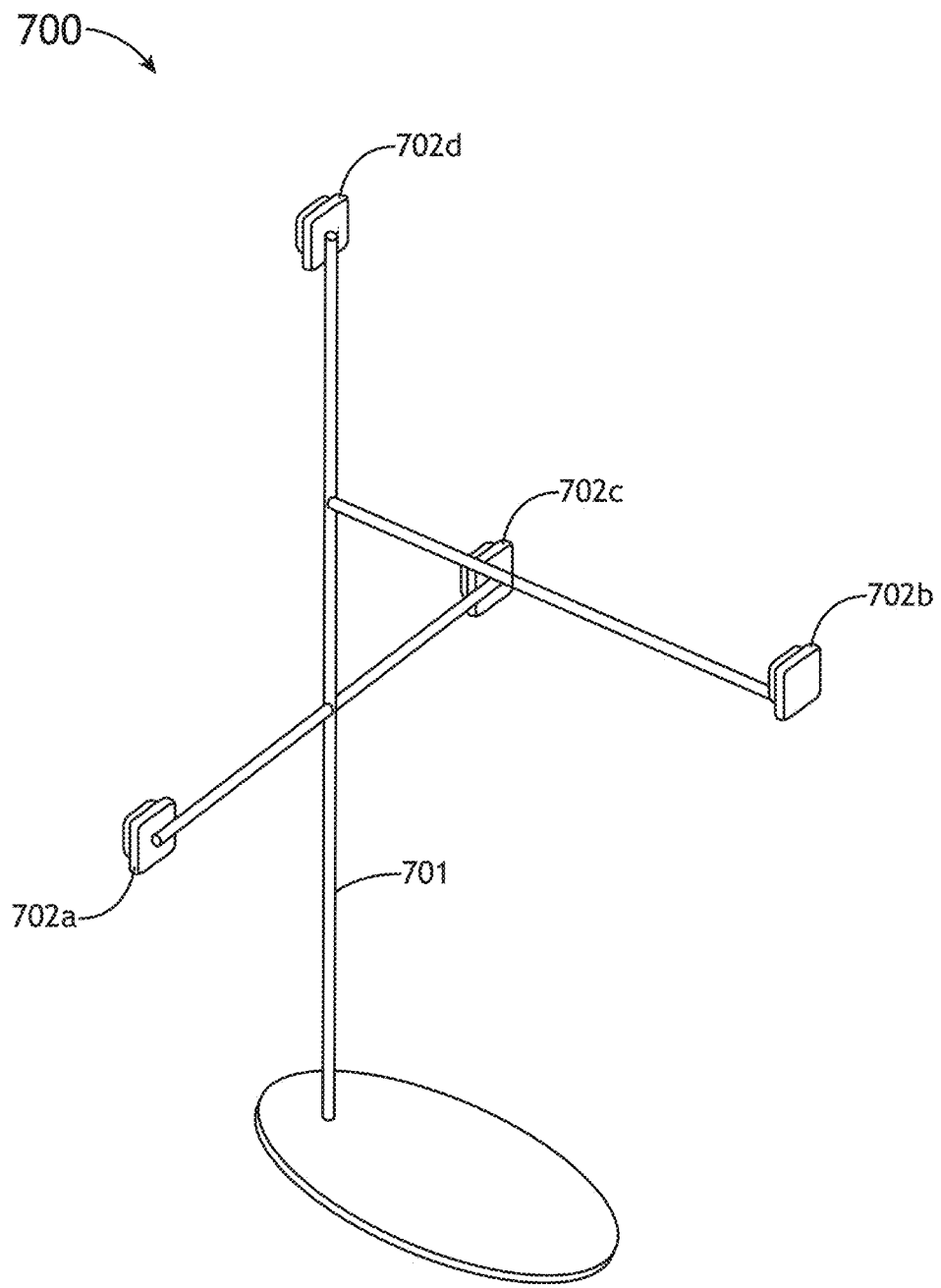

It is noted herein that measurement of an environment and understanding of the position and orientation of machinery/components (e.g., actionable mechanism 104, actionable assembly 102) in a 3D space is critical to being able to program complex motion and ensure safe operation around other elements and people. In embodiments, the 3D tracking system of the stage automation system 100 may include a plurality of anchor constellations 700 to automatically configure the RF tracking system, as shown in FIG. 7A. In embodiments, a single anchor constellation 700 may include a plurality of transponders 702a-702d. GUIDs and/or UUIDs for the anchor constellation 700 and each transponder 702a-702n may be stored in memory 112. Each anchor constellation 700 and transponder 702a-702d may additionally include a distributed program object which may be transmitted throughout the system. In additional and/or alternative embodiments, an anchor constellation 700 including a plurality of transponders 702 may include a single distributed program object such that the anchor constellation 700 is regarded as one single component.

Figure 7B:
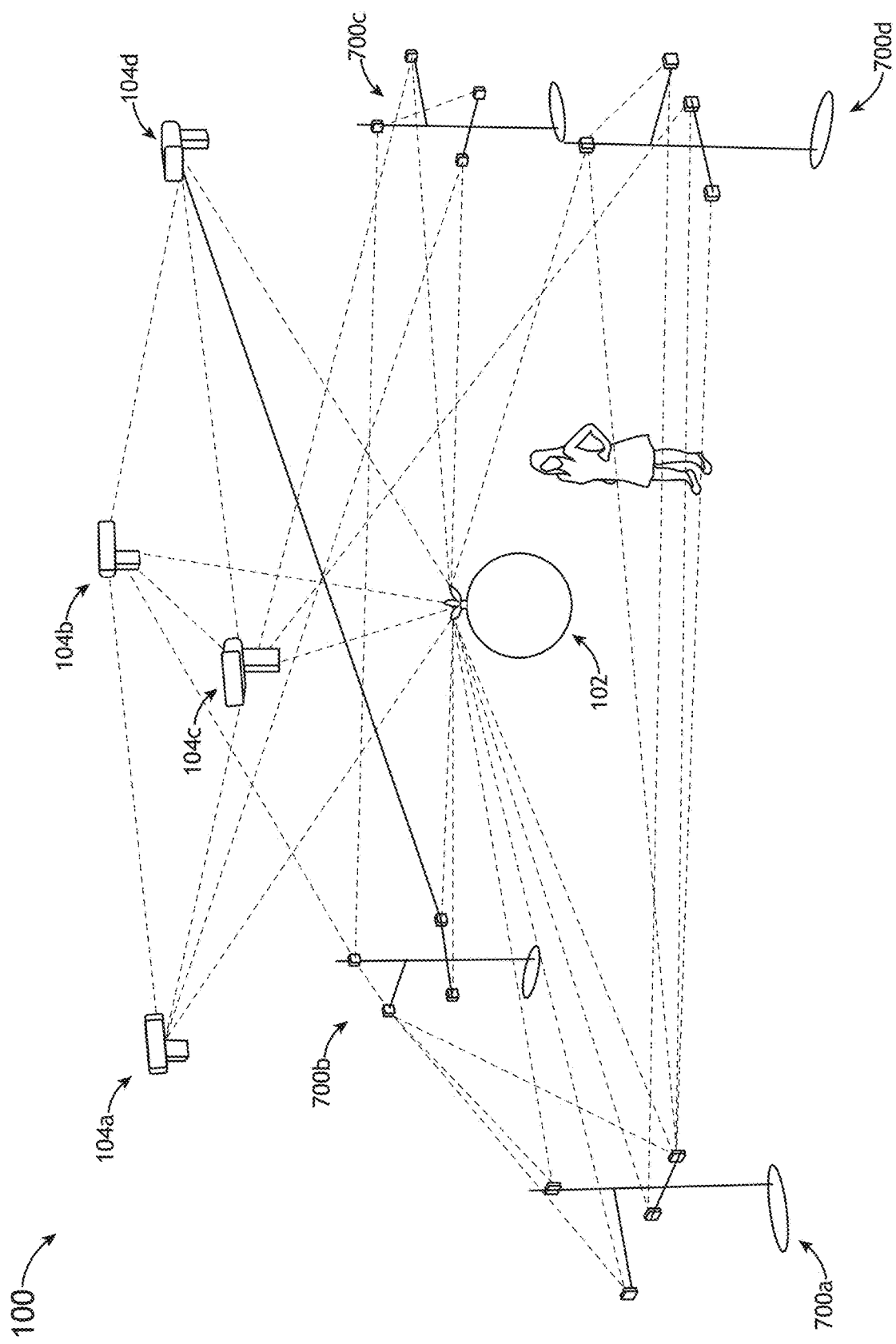
Figure 7D:
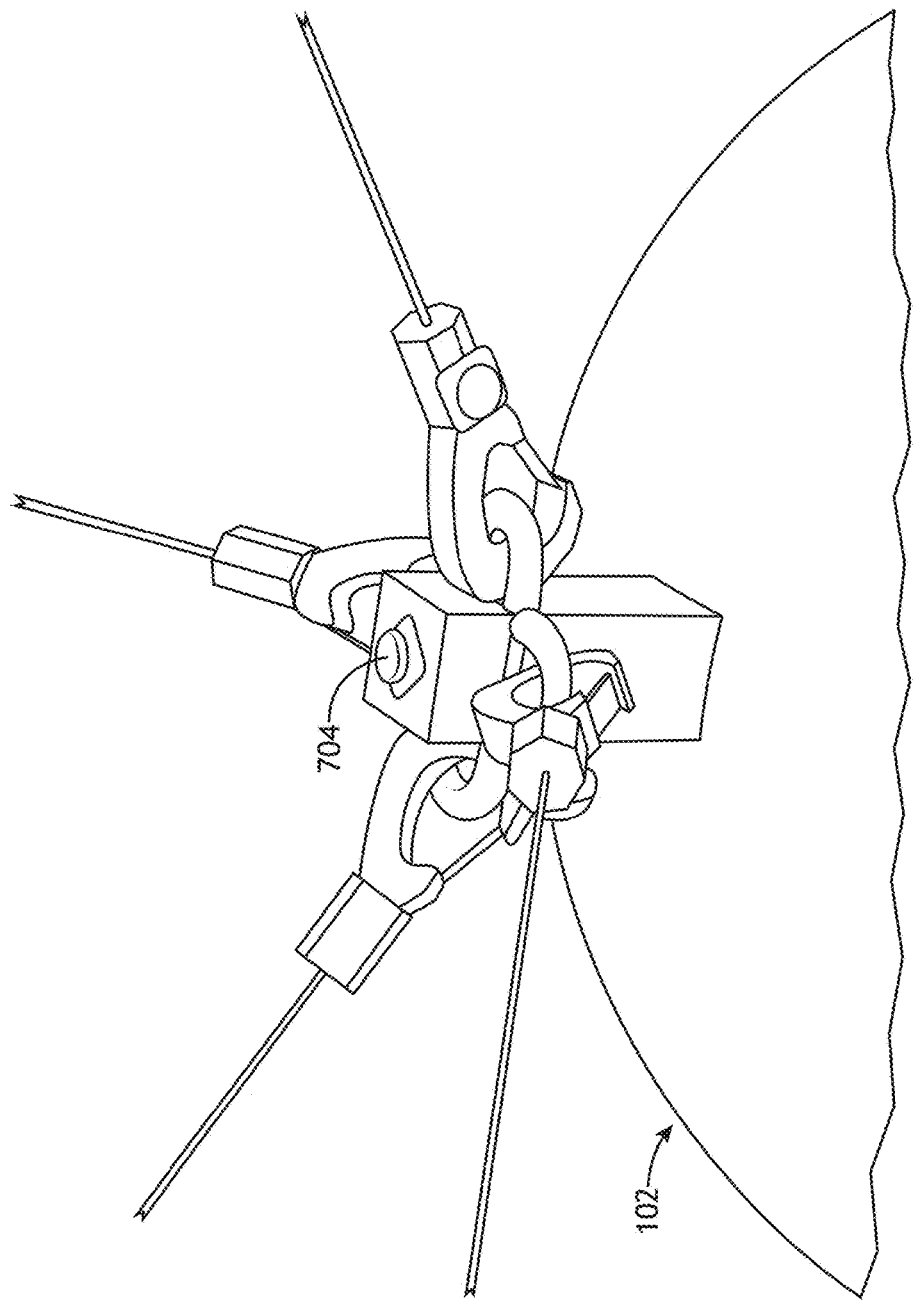
Figure 7E:
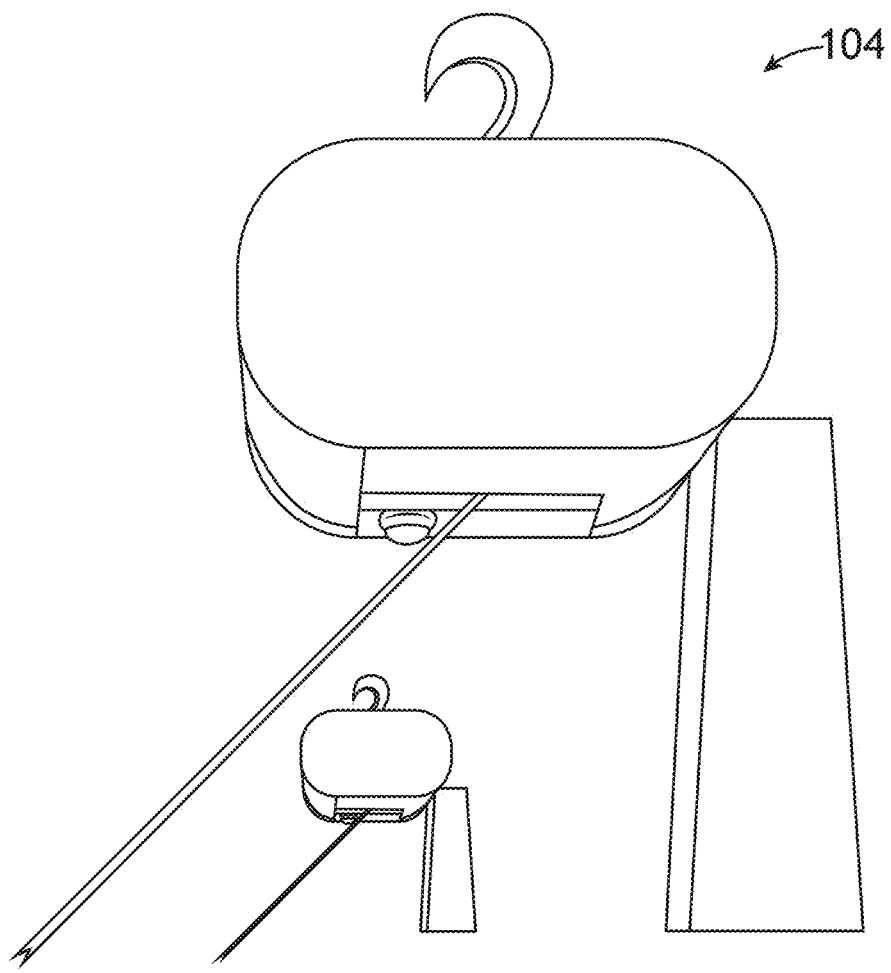

In embodiments, the plurality of transponders 702a-702n may be arranged on a a stiff, static frame 701 (e.g., 3D pyramid). Locations of each the anchor constellation 700 on an event stage may be known, and the heights and distances between each of the transponders may also be known and stored in memory 112. For example, as shown in FIGS. 7B and 7C, a location/position of each anchor constellation 700a-700d of a plurality of anchor constellations 700a-700d may be stored in memory 112. Similarly, the height of each transponder 702 and distances between each transponder 702 may be stored in memory 112. As shown in FIGS. 7B-7C, an environment may include multiple anchor constellations 700, multiple actuators (e.g., multiple actionable mechanisms 104a-104d), and an object moved by the actuators (e.g., chain motor actuatable mechanisms 102a-102d). Trackers 704 may be attached to actuators (e.g., actionable mechanisms 104) and the objects to be moved (e.g., actionable assemblies 102), as shown in FIGS. 7D-7E. A database associating each components UUID to the serial number(s) of the associated trackers may be stored in memory 112. Additionally, the geometry of the actuator in relationship to the trackers may also be stored in memory 112.

By associating UUIDs with the respective components, and associating commands/cues with the UUIDs, the stage automation system 100 may be configured to link particular cues/commands to the associated components to which they are intended. For example, actuators in FIGS. 7C-7D can be identified and operated by their UUID. In this example, an optical scanner on a control device can be used to read a hoist's UUID encoded in a 2D barcode like a QR code, to select it for immediate operation. Physical actuators may also be identified by a unique, persistent UUID that allows the stage automation server 108 to look up what it is, how to configure the drive it's attached to, and how to display it on the user interface 114.

In embodiments, by transmitting signals between the respective trackers 704 and the transponders 702 of each anchor constellation 700, the 3D position of each component of the stage automation system 100 may be triangulated. 3D positional information may be determined using any mathematical formula, algorithm, or technique known in the art including, but not limited to, time-of-flight determinations, inertial measurement units (IMU), and barometric sensors, received signal strength indicator (RSSI) values. For instance, the stage automation system 100 may be configured to utilize RSSI values to reject potentially bad data packets from nodes which may be obstructed, or for signals which have reflected off other surfaces.

In embodiments, movement cues/commands for the sphere (e.g., actionable assembly 102 in FIGS. 7B-7C) may be written in relation to the environment's origin. With knowledge of where all of the hoists and their hooks are, the stage automation server 108 may be configured to selectively move/actuate the suspended sphere anywhere within the area between the hoists. The operator doesn't need to individually program the motion of each hoist, just program the motion the sphere itself. In embodiments, actionable mechanisms 104 and/or actionable assemblies 102 may be configured to receive and/or execute commands in 1D and/or 3D space, dependent upon the physical attributes of the respective actionable mechanisms 104 and/or actionable assemblies 102. Actionable mechanisms 104 and/or actionable assemblies 102 may continuously identify their physical position by transmitting RF positioning feedback to the stage automation server 108 and/or by measurements entered by an operator via user interface 114.

For example, as shown in FIG. 7B, an actionable assembly 102 may be physically actuated (e.g., moved) by four separate actionable mechanisms 104a-104d (e.g., hoists 104a-104d). In this example, commands to move the actionable assembly 102 may be written in the context of 3D space that move the actionable assembly 102 itself, and the stage automation server 108 may transmit jog commands to each respective hoist 104a-104d to achieve the 3D command of the actionable assembly 102. For instance, a user may input a new position for the actionable assembly 102 via the user interface 114. The stage automation server 108 may then calculate the required hoist actuation to achieve the new position indicated by the 3D command, and transmit 3D commands (e.g., jog commands) to each of the hoists 104a-10d. Upon receiving the 3D commands (e.g., jog commands) for the new position of the actionable assembly 102, each hoist 104a-104d may jog the hoist to the determined position. Such calculations may be carried out many times a second, jogging the position of each hoist 104a-104d to achieved desired hoist positions required for the 3D positioning of the actionable assembly 102. In additional and/or alternative embodiments, the calculations required to achieve the positions associated with the user commands may be carried out by processors of the hoists 104a-104d themselves. By writing cues/commands in the context of distributed program objects, the stage assembly system 100 may be configured to command motion of the hoists to match the length that it simulates in 3D space.

It is noted herein grouping a plurality of actionable mechanisms 104 together to move one or more actionable assemblies 102 (e.g., FIG. 7B) may provide a number of benefits. For example, as shown in FIG. 7B, if an operator chooses to move a single actuatable mechanism 104a (hoist 104a) individually instead of as part of the group, the chains of the hoist 104a may slack, resulting in the other three hoists 104b-104d now holding the majority of the weight of the object. In this example, if the operator then sends a 3D move command to the actionable assembly 102, the stage automation server 108 may be configured to first bring all the actionable mechanisms 104 (e.g., hoists 104a-104d) back into a stable position that it expects it to be in (e.g., remove the slack from the hoist 104a), then continue with the move.

It is further herein that writing commands in the context of the actionable assembly 102 being moved, rather than the actionable mechanisms 104 used, can be applied in other contexts. For example, a gantry track (e.g., actionable mechanism 104) and a plurality of hoists (e.g., actionable mechanisms 104) may be used to operate cooperatively in order to selectively actuate/move an actionable assembly 102. In this example, commands may be written for the actionable assembly 102 as distributed program objects such that the cues and commands for the actionable assembly 102 are written for the actionable could be written for the actionable assembly 102 itself, instead of the gantry track and/or hoists individually.

It is noted herein that accurate positional measurements by the operator or automatic measurements by a 3D tracking system may be used for several purposes including, but not limited to: accurate visualization of the 3D environment to a user via the user interface 114; cues can be written to move objects instead of individual actuators; interfaces can show contextual information on objects or devices they're in proximity to or aimed at; augmented reality displays can overlay contextual information on real objects or actuators; actuators can automatically move, level, or tilt objects to predetermined positions without manual human control; objects and actuators can programmatically respond to motion of actors or other non-actuated props; actuators can be automatically assigned to the system via either known proximity of their end effectors; the system can automatically set static or dynamic limits based on known positions of other objects or people.

FIGS. 5-6E-2 illustrate conceptual diagrams of a stage automation system 100, in accordance with one or more embodiments of the present disclosure.

In particular, the conceptual diagrams illustrated in FIGS. 5-6E-2 illustrate how the software components of the stage automation system 100 connect to and control devices (e.g., actionable mechanisms 104, actionable assemblies 102), in a standalone configuration. FIGS. 5-6E-2 further demonstrate how the distributed program objects within the stage automation system 100 software architecture relate to each other. It is noted herein, however, that FIGS. 5-6E-2 are provided solely for example, and are not to be regarded as limiting, unless noted otherwise herein.

The host operating system may include an operating system that contains normal operating system components and functionality including, but not limited to, file system or persistent memory (2), a network stack (3), serial ports (4), RAM, a processor, etc. In some embodiments, the stage automation system 100 may be deployed on some flavor of Linux or Windows on bare metal or a virtual machine, but this environment could also be a Docker container, another generalized container, or an embedded system on a chip with a simple bootloader and operating system-like functionality.

The database file may include persistent storage capable of storing multiple tables of randomly accessible information. This may include a SQLite database file, but could also include a Postgres database managed by a separate Postgres server process, multiple flat CSV files, or key/value pairs stored in EEPROM on an embedded system on a chip. This is not necessarily a requirement for a functioning executing program 106, but may be required for many core features.

"network endpoint" may include an IP address that can send and receive normally-switched ethernet packets on a network, or to a single other networked device. The "endpoint" could be a physical RJ-45 ethernet jack with a single IP address, a single IP address amongst many on a physical RJ-45 port, a fiber-optic port, a virtual port on a virtual switch, a WiFi card, a single IP address on multiple bonded ethernet ports, or any other common computer science concept of a network endpoint. Similarly, a "serial port" may include any serial port commonly known in the art. In practice, this serial port and the physical medium (10) may include a physical DB-9 connector on a box, a USB to serial device, or a virtual serial port shared via another process across a network. It could function as half-duplex or full duplex, with any common state signaling that accompanies common serial standards like RS-232, RS-485, CANbus/CANopen, or UART. Typically, this will present itself to the operating system as a /dev/tty* device on Linux, a COM device on Windows, or a serial device object in an embedded system.

The TCP/IP network may include be a wide variety of actual configurations understood as a "network" with a variety of transport types (9) between/amongst devices, from a single ethernet cable direct to another device, a switched network, a connection passed through a VPN or WiFi network, or any other common computer science understanding of a computer network that switches and broadcasts packets to devices. In embodiments, the stage automation system 100 may not require any abnormal configurations of a TCP/IP network, and any computer network known in the art may be configured to facilitate communication within the stage automation system 100.

In embodiments, a "servo drive" in may include any device known in the art configured to provide power and control to machinery (e.g., actionable mechanism 104, actionable assembly 102). In the context of the stage automation system 100, servo drives and/or servo motors may be used to provide predictable closed-loop control. For the purposes of the present disclosure, it is contemplated that predictable, closed-loop control may be applied to any device which is used to achieve a particular location, speed, temperature, or the like. In this regard, any reference to "servo drive" may additionally and/or alternatively be regarded as applying to other mechanisms including, but not limited to, motors (e.g., DC motors, AC motors), hydraulics, pneumatics, and the like. this example, the servo drives may include identical models of a servo drive connected by different communications technologies, or could be entirely different models of servo drive. FIGS. 5-6E-2 illustrated the multiple devices (e.g., servomotor, brake, limit switches) connected to a single servo drive, which are required to make an actionable mechanism 104/actionable assembly 102. In embodiments, a servo drive may include its own capability to provide power to control motion on the machine (e.g., actionable mechanism 104, actionable assembly 102), and the stage automation system 100 provides it configuration and commands to set it up, and to control it from the stage automation system 100. The stage automation system 100 may regularly poll the drive for information on its status, its configuration, and the status of all its connected peripherals.

The "Instance" may include the executing programs 106, running on a single operating system (e.g., environment, operating system, a Docker-like container, a virtual machine, or an embedded system). The instance may generate its own unique identifier when it's launched, may keep track of its own internal time since it was launched, and manage the distributed program objects and values within itself. A stage automation system 100 could run off of a single Instance (e.g., executing program) that is able to connect directly to all the machinery, or system could run off of multiple executing programs 106 distributed across the network managing multiple machines. All of the arrows drawn within objects enclosed in the Instance box represents communication directly between software objects.

The concept of the "Environment" in the stage automation system 100 encompasses the configuration of the system, and all of the components able to communicate with each other. A running Instance (executing program 106) of the software will hold information about the Environment, and multiple Instances across the network will hold shared information about the Environment and be part of the Environment.

The Database object handles communication with the underlying database system as described previously herein. It handles logging many things throughout the Instance's lifecycle, like XaObjects, what XaValues the XaObjects are linked to, the time & value of variables within those XaValues, network packets, debug information, etc. It also reads data for loading saved EnvironmentConfiguration, servo drive configuration for uniquely identified Axes, XaValue history within the Instance or from previous sessions, etc. Everything else in the Instance calls functions within the Database object to request it save or read data, and the Database object abstracts the underlying database file system.

The NetworkManager handles communication on the TCP/IP network on the operating system for the core Exato systems. Anything to and from Exato's core distributed network system passes through it, and it delivers incoming packets to the objects that need it within the Exato Instance, like the XaValueManager. The XaValueManager is a message broker that monitors all active XaValues in the Instance, whether their source is this Instance or others on the network (not pictured in this logical diagram).

The GeometryManager translates position data of axes into 3D information, based on measured or inferred 3D position and orientation of those axes in real space. It also works with the CueManager to translate object-based cueing into jog commands for individual axes, based on where they are in space. For instance, four hoists may be configured to lift a set piece; those four hoists may be at different heights depending on the theater. The operator writes cues for the set piece to go to various heights, and the GeometryManager translates the requested position of the set piece into commands for the hoists to follow, based on their measured height above the stage that day. The Log is a catch-all of messages from software objects within Exato, with various levels of severity that can be filtered by the operator. All of the Log messages are sent to the Database (21), and optionally to the user interface.

The AxisManager holds all of the automation axis objects in the Instance. It monitors the state of all of them, and presents them to be easily accessible and searched by other objects within the Instance. Its configuration (what Axes it contains, what real AxisDevices those contain & their configuration, etc) may be defined by the EnvironmentConfiguration loaded from the Database or saved to the Database.

The CueManager holds the Environment CueSheet(s), and all of the Cues and Commands contained therein. It also holds the CueExecutor, that calls the AxisManager to call functions on individual axes to make them do things described in Commands. It sequences Commands within Cues; a Cue could hold multiple Commands for an axis that need to run sequentially. Its configuration may also be contained in the EnvironmentConfiguration, and may be loaded from or saved to the Database.

An Axis is an object that contains both an AxisSim and optionally an AxisDevice object. The AxisSim virtually simulates how a real device would respond to configurations and cues, for offline programming and setup of a show. This is an XaObject, which in a distributed network environment would share its existence and associated XaValues with other Instances. In a standalone configuration like this, the XaValues would still exist and log their time & values in the Database.

In this diagram, the AxisDevice connects directly to the operating system's network stack to connect to the servo drive it monitors and controls.

Figure 8:
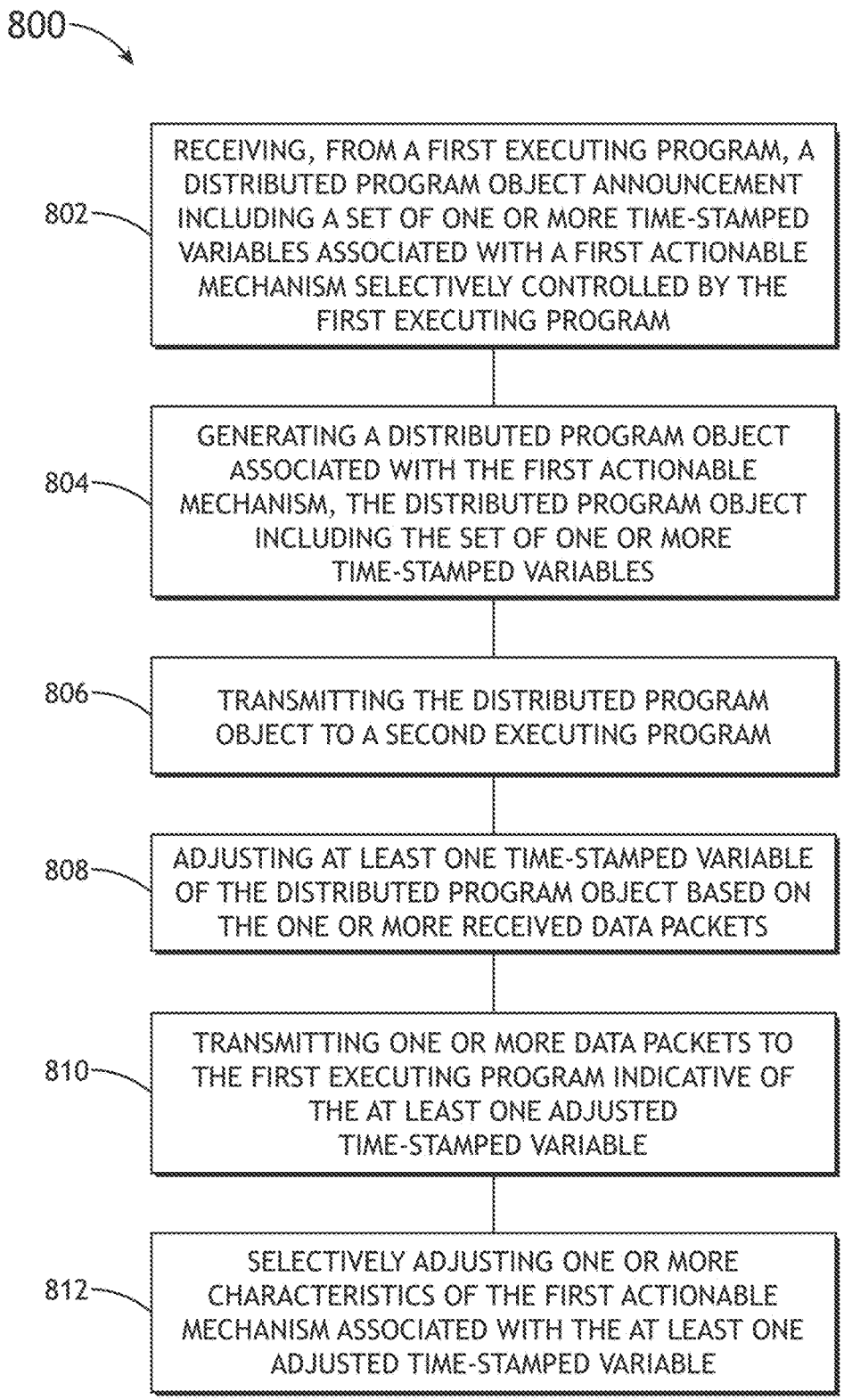
FIG. 8 illustrates a flowchart of a method for operating a stage automation system, in accordance with one or more embodiments of the present disclosure.

FIG. 8 illustrates a flowchart of a method 800 for operating a stage automation system 100, in accordance with one or more embodiments of the present disclosure. It is noted herein that the steps of method 800 may be implemented all or in part by stage automation system 100. It is further recognized, however, that the method 800 is not limited to the stage automation system 100 in that additional or alternative system-level embodiments may carry out all or part of the steps of method 800.

In a step 802, a distributed program object announcement is received from a first executing program 106a. For example, the stage automation server 108 may receive a distributed program object from the first executing program 106a. The distributed program object may include a set of one or more time-stamped variables associated with a first actionable mechanism 104a selectively controlled by the first executing program 106a.

In a step 804, a distributed program object associated with the first actionable mechanism is generated. For example, the stage automation server 108 may be configured to generate and store a distributed program object associated with the first actionable mechanism 104a in memory 112, wherein the distributed program object includes the set of one or more time-stamped variables.

In a step 806, the distributed program object is transmitted to a second executing program. For example, the stage automation server 108 may be configured to transmit a distributed program object announcement to the second executing program 106b. Subsequently, the one or more data packets are received from the second executing program. For example, the second executing program 106b may update/adjust one or more time-stamped variables of the distributed program object, and transmit one or more update data packets to the first executing program 106a via the stage automation server 108.

In a step 808, at least one time-stamped variable of the distributed program object is adjusted based on the one or more received data packets. For example, upon receiving the one or more update data packets from the second executing program 106b, the stage automation server 108 may be configured to adjust the one or more time-stamped variables adjusted by the second executing program 106b based on the received update data packets.

In a step 810, one or more data packets are transmitted to the first executing program indicative of the at least one adjusted time-stamped variable. For example, the stage automation server 108 may be configured to forward the one or more update data packets indicative of the one or more updated time-stamped variables.

In a step 812, one or more characteristics of the first actionable mechanism associated with the at least one adjusted time-stamped variable are selectively adjusted. For example, the first executing program 106b may be configured to generate one or more control signals configured to selectively adjust one or more operational characteristics of the first actionable mechanism 104a based on the one or more updated time-stamped variables.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:
1. A stage automation system, comprising:
a first executing program configured to selectively control a first actionable mechanism;
a second executing program configured to selectively control a second actionable mechanism; and
a stage automation server communicatively coupled to the first executing program and the second executing program via a network protocol, the stage automation server including one or more processors configured to execute a set of program instructions stored in memory, the set of program instructions configured to cause the one or more processors to:
receive, from the first executing program, a distributed program object announcement including a set of one or more time-stamped variables associated with the first actionable mechanism;
generate a distributed program object associated with the first actionable mechanism, the distributed program object including the set of one or more time-stamped variables;
transmit the distributed program object announcement to the second executing program;
receive one or more data packets from the second executing program;
adjust at least one time-stamped variable of the distributed program object stored in memory based on the one or more received data packets; and
transmit one or more data packets to the first executing program,
wherein the one or more data packets are configured to cause the first executing program to adjust the at least one time-stamped variable of the distributed program object associated with the first actionable mechanism,
wherein the first executing program is configured to adjust one or more characteristics of the first actionable mechanism associated with the at least one adjusted time-stamped variable.
2. The stage automation system of claim 1, wherein the stage automation server is further configured to:
receive one or more data packets from the first executing program; and
adjust at least one time-stamped variable of the set of one or more time-stamped variables of the distributed program object stored in memory based on the one or more received data packets.

3. The stage automation system of claim 1, wherein at least one of the first actionable mechanism or the second actionable mechanism comprises at least one of a motor, a linear motor, a brake, a valve, a solenoid, a power source, or a light.

4. The stage automation system of claim 1, wherein at least one of the first actionable mechanism or the second actionable mechanism is configured to adjust one or more characteristics of one or more actionable assemblies.

5. The stage automation system of claim 4, wherein the one or more actionable assemblies comprise at least one of a stage elevator, a lineset, a screen track, a winch, or a turntable.

6. The stage automation system of claim 1, wherein the distributed program object announcement includes a set of one or more value types defining the set of one or more time-stamped variables such that each time-stamped variable of the set of one or more time-stamped variables is defined by a value type of the set of one or more value types.

7. The stage automation system of claim 6, wherein the set of one or more value types includes at least one of a Boolean value type, a long integer value type, a double float value type, a string value type, or a byte array value type.

8. The stage automation system of claim 1, wherein the distributed program object announcement includes a set of one or more variable modes defining the set of time-stamped variables such that each time-stamped variable of the set of one or more time-stamped variables is defined by a variable mode of the set of one or more variable modes.

9. The stage automation system of claim 8, wherein the set of one or more variable modes includes at least one of a publish variable mode, a subscribe variable mode, or an omni-publish variable mode.

10. The stage automation system of claim 1, wherein the distributed program object announcement includes a set of one or more value types defining the set of time-stamped variables such that each time-stamped variable of the set of one or more time-stamped variables is defined by a value type of the set of one or more value types.

11. The stage automation system of claim 1, wherein each time-stamped variable of the set of one or more time-stamped variables includes a universally unique identifier (UUID).

12. The stage automation system of claim 1, wherein the network protocol comprises at least one of a transmission control protocol (TCP) network or a serial network.

13. The stage automation system of claim 1, wherein the stage automation server is further configured to:
receive one or more input commands from a user interface; and
adjust at least one time-stamped variables of the set of one or more time-stamped variables of the distributed program object stored in memory based on the one or more input commands received from the user interface.

14. The stage automation system of claim 1, wherein the set of one or more time-stamped variables associated with the first actionable mechanism define one or more operational characteristics of the first actionable mechanism.

15. The stage automation system of claim 14, wherein the one or more operational characteristics comprise at least one of an operational state, a location, a velocity, an acceleration, a fault state, or a voltage of the first actionable mechanism.

16. The stage automation system of claim 1, wherein the stage automation server is further configured to:
store a cue sheet in memory, the cue sheet including a first command executable by the first actionable mechanism, and a second command executable by the second actionable mechanism.

17. The stage automation system of claim 16, wherein the stage automation server is further configured to:
transmit one or more data packets associated with the first command to the first executing program, wherein the first executing program is configured to adjust at least one time-stamped variable of the first actuatable mechanism in order to execute the first command; and
transmit one or more data packets associated with the second command to the second executing program, wherein the second executing program is configured to adjust at least one time-stamped variable of the second actuatable mechanism in order to execute the second command.

18. A stage automation system, comprising:
a stage automation server communicatively coupled to one or more executing programs via a network protocol, the stage automation server including one or more processors configured to execute a set of program instructions stored in memory, the set of program instructions configured to cause the one or more processors to:
receive, from a first executing program, a distributed program object announcement including a set of one or more time-stamped variables associated with an actionable mechanism running on the first executing program;
generate a distributed program object including the set of one or more time-stamped variables in memory;
transmit the distributed program object to at least one additional executing program;
receive one or more data packets from the at least one additional executing program;
adjust at least one time-stamped variables of the set of one or more time-stamped variables of the distributed program object stored in memory based on the one or more received data packets; and
transmit one or more data packets to the first executing program, wherein the one or more data packets are configured to cause the first executing program to adjust at least one time-stamped variable of the one or more time-stamped variables associated with the actionable mechanism and adjust one or more characteristics of the actionable mechanism associated with the at least one adjusted time-stamped variable.

19. The stage automation system of claim 18, wherein the stage automation server is further configured to:
receive one or more data packets from the first executing program; and
adjust at least one time-stamped variable of the set of one or more time-stamped variables of the distributed program object stored in memory based on the one or more received data packets.

20. A method comprising:
receiving, from a first executing program, a distributed program object announcement including a set of one or more time-stamped variables associated with an first actionable mechanism running the first executing program;
generating a distributed program object including the set of one or more time-stamped variables in memory;

transmitting the distributed program object to at least one additional executing program;
receiving one or more data packets from the at least one additional executing program;
adjusting at least one time-stamped variable of the one or more time-stamped variables of the distributed program object stored in memory based on the one or more received data packets;
transmitting one or more data packets to the first executing program, wherein the one or more data packets are configured to cause the first executing program to adjust at least one time-stamped variable of the one or more time-stamped variables associated with the actionable mechanism; and
adjusting one or more characteristics of the actionable mechanism associated with the at least one adjusted time-stamped variable.

\* \* \* \* \*